(12) United States Patent
Takihiro et al.

(10) Patent No.: US 8,488,445 B2
(45) Date of Patent: Jul. 16, 2013

(54) GATEWAY DEVICE, OPTICAL NETWORK TERMINAL, AND PASSIVE OPTICAL NETWORK SYSTEM

(75) Inventors: Masatoshi Takihiro, Yokohama (JP); Takahiro Yoshida, Tokyo (JP); Tetsuhiko Takahashi, Yokohama (JP); Yu Mitsui, Fujisawa (JP); Ryuji Ishii, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1521 days.

(21) Appl. No.: 12/034,993

(22) Filed: Feb. 21, 2008

(65) Prior Publication Data
US 2008/0298799 A1 Dec. 4, 2008

(30) Foreign Application Priority Data
Jun. 1, 2007 (JP) ................................. 2007-146425

(51) Int. Cl.
*H04L 12/26* (2006.01)
(52) U.S. Cl.
USPC ............................... 370/217; 370/221; 398/2
(58) Field of Classification Search
USPC ....... 370/217–220, 221–224, 225–228; 398/2
See application file for complete search history.

(56) References Cited

U.S. PATENT DOCUMENTS

| | | | | |
|---|---|---|---|---|
| 6,363,065 B1 * | 3/2002 | Thornton et al. | ............. | 370/352 |
| 6,975,586 B1 * | 12/2005 | Yoshimura | ................... | 370/217 |
| 7,046,684 B2 | 5/2006 | Matsuura | | |
| 7,962,038 B2 * | 6/2011 | Chen | ............................... | 398/69 |
| 2004/0264961 A1 * | 12/2004 | Nam et al. | ..................... | 398/58 |
| 2007/0025735 A1 | 2/2007 | Sakamoto et al. | | |
| 2007/0195823 A1 * | 8/2007 | Biegert | ........................ | 370/485 |

FOREIGN PATENT DOCUMENTS

| | | |
|---|---|---|
| JP | 2002-290551 | 10/2002 |
| JP | 2003-124967 A | 4/2003 |
| JP | 2004-104438 A | 4/2004 |
| JP | 2004-186766 A | 7/2004 |
| JP | 2006-13793 A | 1/2006 |
| JP | 2007-104689 A | 4/2007 |

* cited by examiner

*Primary Examiner* — Dang Ton
*Assistant Examiner* — Mandish Randhawa
(74) *Attorney, Agent, or Firm* — Mattingly & Malur, PC

(57) ABSTRACT

In a broadband access network, calls can be kept active even when a telephone network fails. A voice gateway function captures callee telephone number information sent from a caller subscriber telephone to the telephone network and, when the telephone network fails, keeps the call active by retaining the connection between the caller and the callee. Furthermore, when the telephone network fails, the operation mode of the voice gateway and all ONTs is switched from an H.248 gateway mode to an SIP softswitch mode, allowing the voice gateway function to relay communication packets between ONTs and new call connections to be made in the broadband access network.

9 Claims, 24 Drawing Sheets

CONTROL PLANE PROTOCOL STACK

DATA PLANE PROTOCOL STACK

FIG. 7

DIRECTORY INFORMATION

218

| CRV | POTS LINE NAME | DIRECTORY NUMBER | ONT IP ADDRESS |
|---|---|---|---|
| 1001 | Phy2_1 | (123) 4567 | 192.168.2.1 |
| | | | |

FIG. 8

ACTIVE CALL INFORMATION

219

| CALL ID | CALLER INFORMATION | | | | CALLEE INFORMATION | | | |
|---|---|---|---|---|---|---|---|---|
| | CRV | POTS LINE NAME | TIME SLOT | RTP SESSION | CRV | POTS LINE NAME | TIME SLOT | RTP SESSION |
| 1 | 1 | Phy1_1 | line1_slot1 | 192.168.1.1 Port 20001 | 1001 | Phy2_1 | line2_slot1 | 192.168.2.1 Port 20001 |
| | | | | | | | | |

| MAC ADDRESS | PATH ID |
|---|---|
| aa.bb.cc.dd.ee.ff | 1 |
| aa.bb.cc.gg.hh.ii | 2 |
| | |

| IP ADDRESS | MAC ADDRESS | PATH ID |
|---|---|---|
| 192.168.2.1 | aa.bb.cc.dd.ee.ff | 1 |
| 192.168.2.2 | aa.bb.cc.gg.hh.ii | 2 |
| | | |

GATEWAY DEVICE, OPTICAL NETWORK TERMINAL, AND PASSIVE OPTICAL NETWORK SYSTEM

CLAIM OF PRIORITY

The present application claims priority from Japanese application JP 2007-146425 filed on Jun. 1, 2007, the content of which is hereby incorporated by reference into this application.

FIELD OF THE INVENTION

The present invention relates to a voice gateway device which, in a broadband access network, can keep a call active even when a telephone network fails.

BACKGROUND OF THE INVENTION

As high-quality broadband Internet access services using optical fibers are disseminated, services to integrate a traditional telephone service into an Internet access service have been increasing. Such integration services realize a telephone service using Internet access lines without using telephone lines connected into subscribers' homes. A telephone service can be integrated into an Internet access network by, broadly classified, the following two methods:
(1) Configuring softswitch using SIP (RFC3261: Session Initiation Protocol) and H.248/Megaco (RFC3525: Gateway Control Protocol). No telephone network is used.
(2) Connecting an Internet access network to an existing telephone network using a voice gateway which has a signaling function such as an SIP function or an H.248/Megaco on the Internet access network side and a signaling function for traditional telephone switching on the telephone network side and which can convert voice data bidirectionally between a packet format and a TDM (time division multiplexed) format.

The method (1) requiring no telephone switch is economically advantageous. In terms of reliability, however, services realized by the method (1) are inferior to those offered by a traditional telephone network. Furthermore, there can be cases where an Internet access network realized by the method (1) cannot support some supplementary services (such as three-way talk and emergency call services) offered by a traditional telephone network. The method (2) is disadvantageous in that it requires an existing telephone network to be retained. However, since it connects an Internet access network directly to an existing telephone network, it can realize telephone services which are comparable in quality to traditional telephone services and which can support supplementary services equivalent to those offered by a traditional telephone network. Another advantage of the method (2) is that it allows telephone companies which have been providing traditional telephone services to make effective use of their existing equipment.

The present invention relates to a voice gateway which, in a network realized by the method (2), connects an Internet access network and an existing telephone network, and an OLT (optical line terminator) and an ONT (optical line terminal) which provide Internet access lines of optical fibers.

Many voice gateways are available for use in the method (2) to connect an Internet network (IP network) and a telephone network, but they are intended for application to:
(A) A network operating format in which an access network portion of an existing telephone network is utilized while a backbone network portion of the existing telephone network is replaced with an IP network to reduce transit line cost.

In terms of a voice gateway intended for application to the network operating format (A), a technique which takes into consideration how to cope with a failure of a general IP network with low reliability is disclosed in JP-A No. 2002-290551. The technique is aimed at keeping a call active even when the relevant IP network fails or even when a server installed in the IP network, for example, an SIP server or a Media Gateway Controller (MGC) based on H.248/Megaco develops a failure.

SUMMARY OF THE INVENTION

In the network operating format (A), however, a failure of the existing telephone network integrated in a broadband Internet access service providing telephone services causes all the telephone services to be stopped. The voice gateway function according to the present invention, on the other hand, is intended for application to:
(B) A network operating format in which, to achieve integration of telephone lines and broadband access lines, an IP access network is used for accessing telephone lines and a traditional telephone switch network is used as a backbone network.

No technique has been known like the gateway function of the present invention that connects IP-based telephone access lines to an existing telephone switch network and that keeps calls active even when an existing telephone network used as a backbone network develops a failure. The voice gateway function according to the present invention takes into consideration application to an OLT which uses PON (passive optical network) technique and which provides optical access lines. Generally, up to several thousand subscriber telephones are connected to one OLT, so that a connection line failure between an OLT and a telephone network can seriously affect the services provided using the telephone network. There is therefore a great demand for the function realized by the present invention.

The present invention provides a gateway device connected to a telephone network and a plurality of data networks connected to ONTs (optical network terminals) accommodating telephones. The gateway device comprises a storage for storing telephone number information on the telephones connected to the plurality of data networks, acquires callee telephone number information included in voice data sent from a caller telephone connected to one of the plurality of data networks to a telephone switch included in the telephone network, records, in a case where the callee telephone is also connected to the one of the plurality of data networks, information on a talk channel between the caller telephone and the telephone switch, detects a call incoming from the telephone switch to the callee telephone, and records information on a talk channel between the telephone switch and the callee telephone. When a failure is detected in the telephone network, the gateway device connects, based on the information on the two talk channels to which the caller telephone and the callee telephone are connected, respectively, the two talk channels and keeps the call active without involving the telephone network.

The voice gateway according to the present invention can, even when an associated telephone network fails, keep calls between telephones connected to ONTs which are connected to an associated OLT active and make new call connections between telephones belonging to such ONTs.

BRIEF DESCRIPTION OF THE DRAWINGS

FIG. 7 is a diagram showing directory information;

FIG. 8 is a diagram showing active call information;

FIG. 9 is a diagram showing MAC-path information;

FIG. 10 is a diagram showing ARP information;

DETAILED DESCRIPTION OF THE PREFERRED EMBODIMENTS

The present invention provides a voice gateway function which has been realized by incorporating minimum supplementary functions and which enables a telephone service in a broadband access network to be continued even when an associated telephone network fails.

First Embodiment

Figure 1:
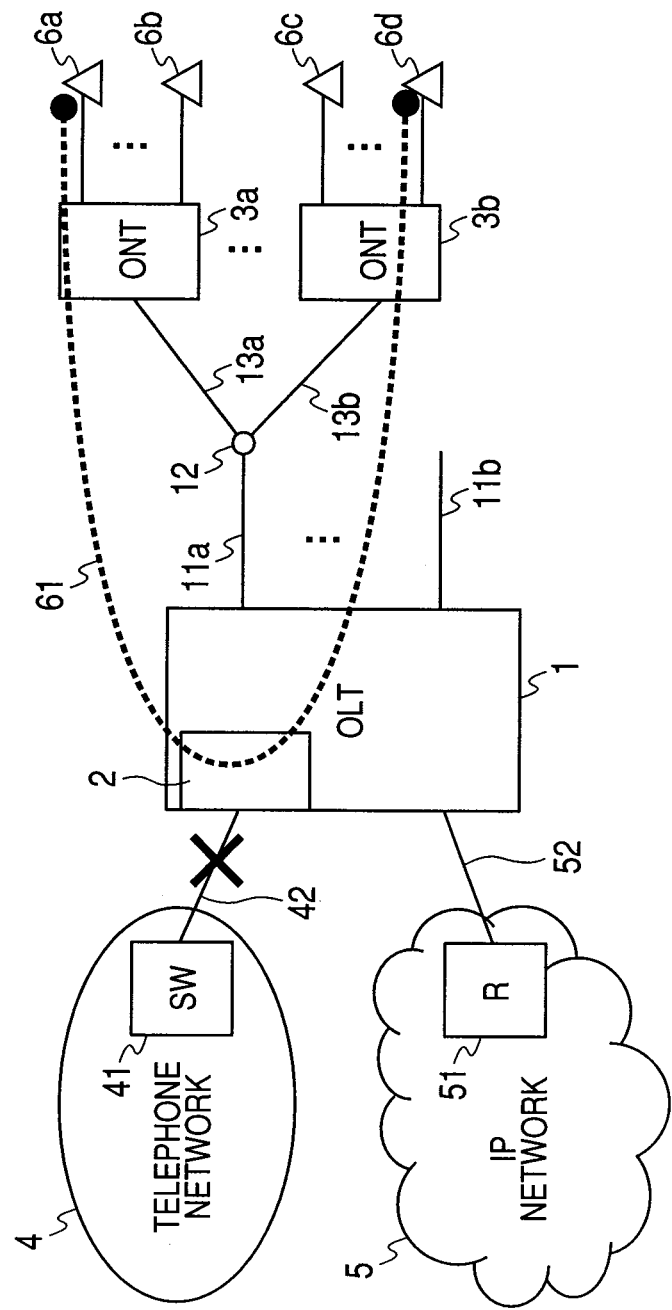
FIG. 1 is a diagram showing how a call is processed when a failure occurs.

FIG. 1 is a diagram showing an example configuration of a broadband access network to which the present invention is applied. In FIG. 1, how application of the present invention enables a telephone service to be continued at a time of a network failure is illustrated. In the example case illustrated in FIG. 1, a telephone connection service is continued even after a line 42 between a telephone network 4 and an OLT (optical line terminator) 1 fails.

The OLT 1 installed in a broadband access network accommodates an optical fiber 11a, a splitter 12 which branches and multiplexes an optical signal, and ONTs (optical network terminals) 3a to 3b installed in subscribers' homes via optical fibers 13a to 13b. The OLT 1 is connected to a telephone switch 41 included in the telephone network 4 via a line 42 and to a router 51 included in the IP network 5 via a line 52. Reference numeral 2 denotes a voice gateway (hereinafter referred to as the "VGW") connecting the OLT 1 and the telephone switch 41 included in the telephone network 4. The ONT 3a accommodates subscribers' telephones 6a to 6b, and the ONT 3b accommodates subscribers' telephones 6c to 6d. Reference numeral 61 denotes a flow of telephone voice data. As shown, when the line 42 fails causing the OLT 1 and the telephone network 4 to be disconnected from each other, conversation between the telephones 6a and 6d is enabled via the VGW 2.

Figure 2:
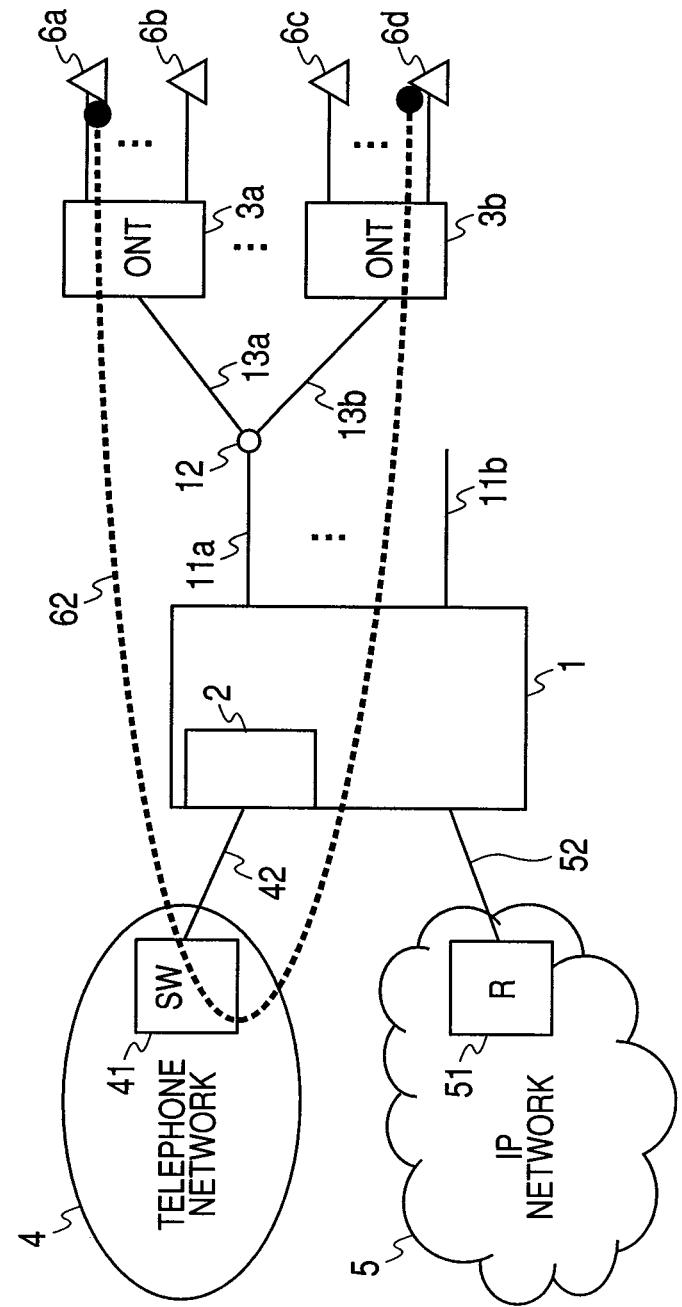
FIG. 2 is a diagram showing how a call is processed in a normal state.

FIG. 2 shows a normal faultless state of a broadband access network to which the present invention is applied and in which a telephone service is provided. The network configuration shown in FIG. 2 is similar to that shown in FIG. 1. FIGS. 1 and 2 differ in the flow of telephone voice data. The flow of telephone voice data, denoted by reference numeral 62, in a normal state of the broadband access network shown in FIG. 2 differs from the flow of telephone voice data 61 in a faulty state of the broadband access network shown in FIG. 1. When the network is in a normal state, even when a caller and a callee converse with each other using telephones connected to ONTs which are connected to the OLT 1, their voice data is exchanged via the telephone switch 41. Namely, the VGW 2 is a gateway having a function of converting signaling and voice transmission formats. It requires neither a switching function like that of a telephone switch nor a function for providing a supplementary service like three-way calling.

Figure 3:
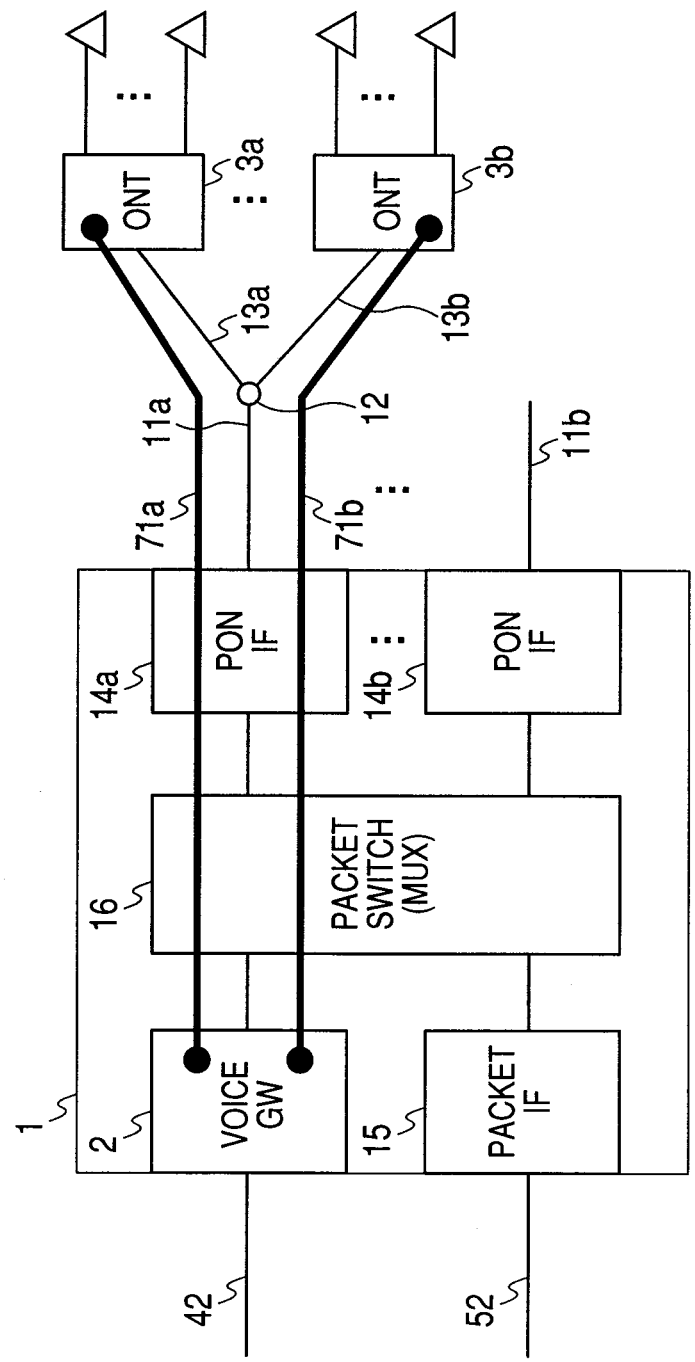
FIG. 3 is a diagram showing paths set up in an OLT configuration.

FIG. 3 shows an example configuration of the OLT 1 having a VGW function according to the present invention. The configuration includes a VGW function 2, a packet interface 15, PON interfaces 14a to 14b, and a packet switch 16 which can multiplex data packets received from ONTS. The VGW 2 is connected to the telephone network via the line 42. The packet interface 15 is connected to the IP network via the line 52. The PON interfaces 14a to 14b accommodate plural ONTs 3a to 3d. In the OLT configuration shown in FIG. 3, the PON interface 14a accommodates the ONTs 3a to 3b via the lines 13a to 13b, the splitter 12, and the line 11a. Between the VGW 2 and each of the ONTs, a logical path is set up as a point-to-point line for exchanging signaling messages and telephone voice data. As shown in FIG. 3, logical paths 71a and 71b are set up between the VGW 2 and the ONT 3a and between the VGW 2 and the ONT 3b, respectively. Communications between the VGW 2 and the ONTs 3a and 3b are carried out using the logical paths.

Figure 4:
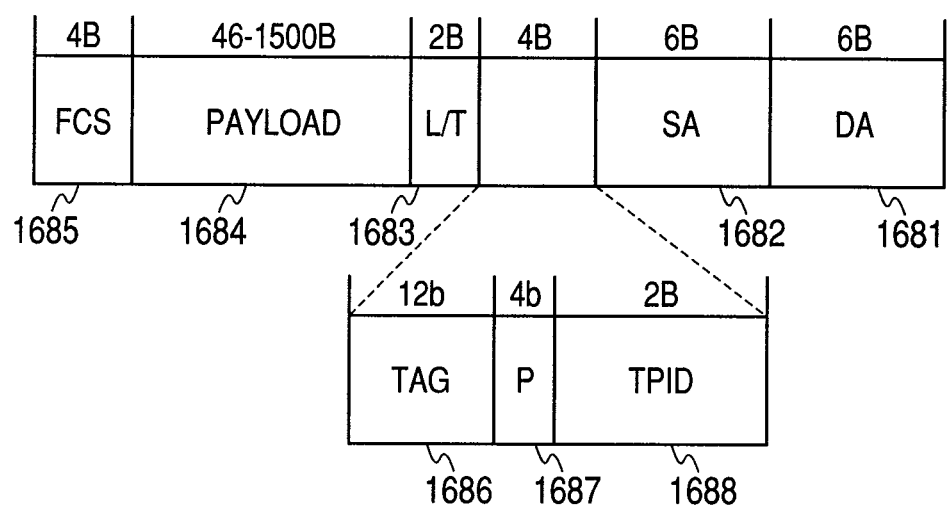
FIG. 4 is a diagram showing an Ethernet frame format used in the OLT.

FIG. 4 shows an Ethernet frame based on IEEE802.3 as an example packet format used at the packet switch 16. The Ethernet frame includes a six-byte destination address (DA) 1681, a six-byte sender address (SA) 1682, a two-byte tag protocol ID (TPID) 1688 which indicates that tag information is used, a four-bit transfer priority value (P) 1687, a 12-bit tag value (Tag) 1686, a two-byte packet type value or packet length value (L/T) 1683, a payload 1684 ranging from 46 to 1500 bytes, and a four-byte frame check sequence (FCS) 1685. In the present embodiment, a logical path is set up between the VGW 2 and each of the ONTs using the tag value 1686 as a logical path ID.

Figure 5A:
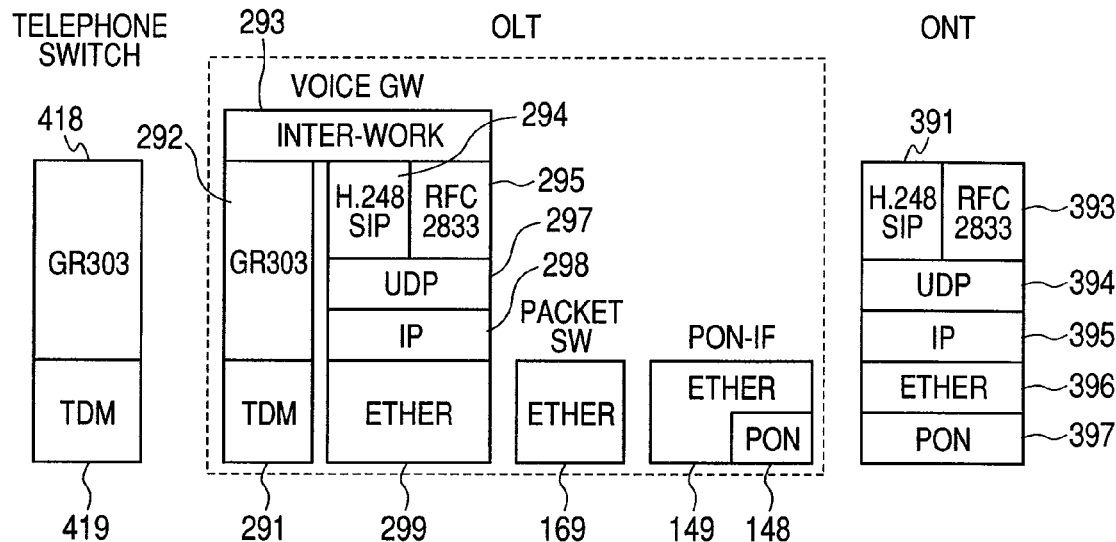
FIG. 5A and FIG. 5B are diagrams each showing a system protocol stack.
Figure 5B:
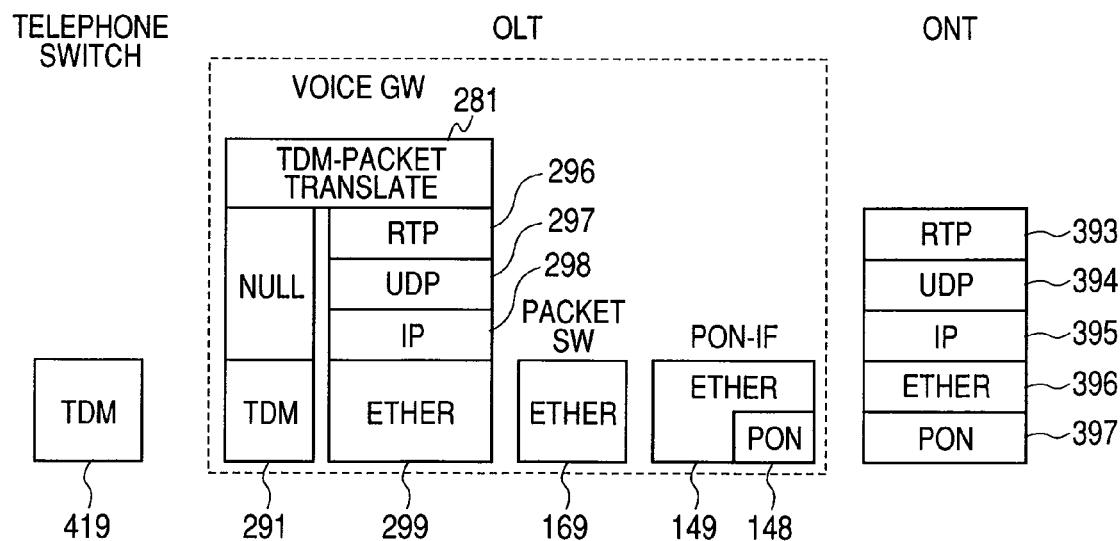

FIGS. 5A and 5B show protocol stack configurations of an ONT, an OLT having a VGW function, and a telephone switch. Shown in FIG. 5A is a control plane protocol stack. Shown in FIG. 5B is a data plane protocol stack. In the control plane protocol stack shown in FIG. 5A, the line interface of the ONT includes a PON layer 397, an Ethernet layer 396, an IP layer 395, and a UDP layer 394. H.248 and SIP (391) and RFC2833 (393) are provided as signaling protocols at a level above the UDP layer 394. In the OLT, an Ethernet frame encapsulated by a PON layer 148 and an Ethernet layer 149 are interconverted at the PON interface, and the packet switch connects the PON interface and the VGW at an Ethernet layer 169. The VGW, like the ONT, has an Ethernet layer 299, an IP layer 298, and a UDP layer 297 on the packet switch side. At a level above these layers, H.248 and SIP (294) and RFC2833 (295) are provided as signaling protocols. On the telephone switch side, the VGW has a TDM layer 291 including DS1 and a GR303 layer 292 including a signaling protocol. Furthermore, the VGW is provided with an interwork function 293 for signaling protocol conversion between the packet switch and the telephone switch. The telephone switch has a TDM layer 419 for data transfer and a GR303 layer 418 including a signaling protocol.

In the data plane protocol stack shown in FIG. 5B, the line interface of the ONT includes a PON layer 397, an Ethernet layer 396, an IP layer 395, a UDP layer 394, and an RTP (realtime transport protocol) layer 393. In the OLT, an Ethernet frame encapsulated by a PON protocol 148 and an Ethernet layer 149 are interconverted at the PON interface, and the packet switch connects the PON interface and the VGW at an Ethernet layer 169. The VGW, like the bNT, has an Ethernet layer 299, an IP layer 298, a UDP layer 297, and an RTP layer 296 on the packet switch side. At a level above these layers, a TDM-packet translator 281 for converting transfer data between an Ethernet frame format used on the packet switch side and a TDM format used on the telephone switch side is provided. On the telephone switch side, the VGW has a TDM layer 291 including DS1. Similarly, the telephone switch has a TDM layer 419.

Figure 6:
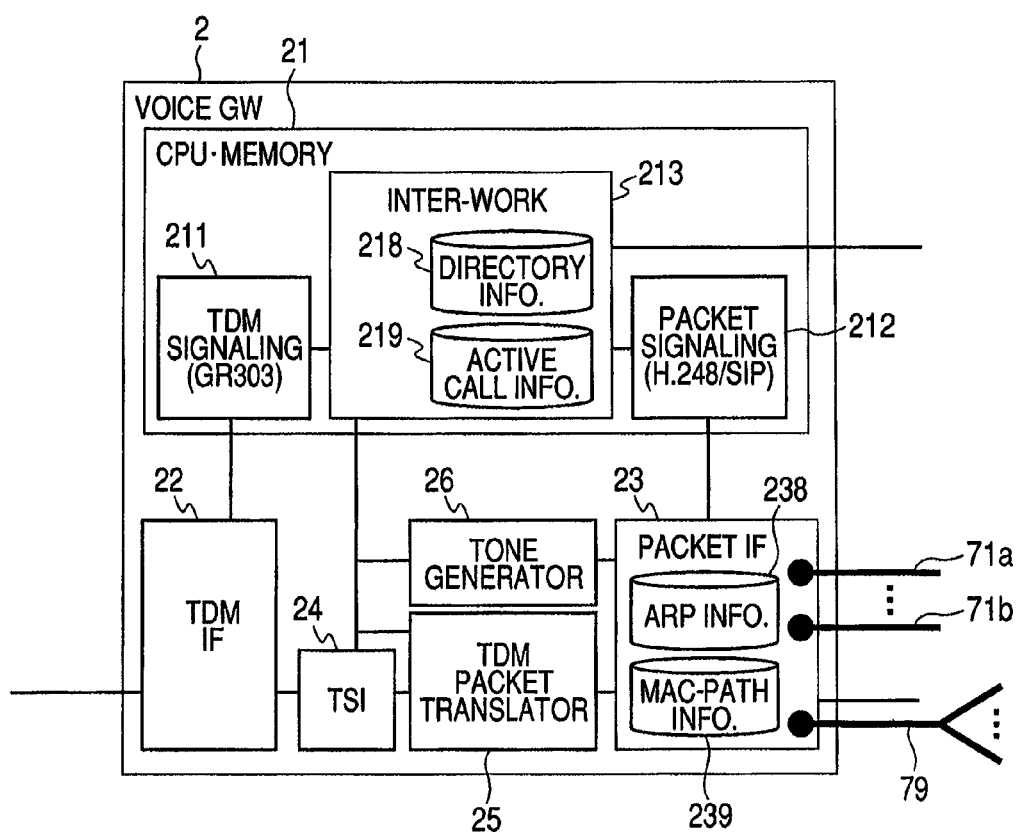
FIG. 6 is a diagram showing a VGW configuration.

FIG. 6 shows a configuration of the VGW 2. The VGW 2 includes a TDM interface 22 which accommodates lines connected to the telephone switch, a packet interface 23 connected to the packet switch, a TSI (time slot interchange) 24 which controls connections between time slots, a TDM-packet translator 25, a tone generator 26, and a CPU/memory section 21. The TSI 24 connects the TDM-packet translator 25 and the TDM interface 22. The TDM-packet translator 25 is connected to the packet interface 23. The tone generator 26 generates a tone required for telephone call control. In the present embodiment, the tone generator 26 is used when releasing a call kept active, as described later, when a failure occurred. The TDM interface 22, the TSI 24, the tone generator 26, the TDM-packet translator 25, and the packet interface 23 are each connected to the CPU/memory section 21, so that they can be controlled from the CPU/memory section 21.

The packet interface 23 has ARP information 238 and MAC-path information 239. As shown in FIG. 10, the ARP information 238 relates the MAC addresses of ONTs, the IP addresses of the ONTs, and the IDs of logical paths set up between the VGW function and the ONTs. As shown in FIG. 9, the MAC-path information 239 relates the MAC addresses of the ONTs and the IDs of the logical paths connecting the VGW and the ONTs. The VGW sends packets to ONTs based on these items of information. When an ONT is registered, its IP address is set and registered in the ARP information 238 by a system administrator. When an ONT is registered, a logical path between the VGW and the ONT is also set. The logical path is registered, related with the IP address of the ONT, in the ARP information 238. The MAC address of each ONT registered in the ARP information 238 is either obtained from the ONT by the VGW using the ARP protocol (RFC826) or set by the system administrator. The above procedure completes the ARP information 238. Of these items of information, the MAC-path information 239 provides correspondences between the MAC addresses and logical path IDs.

When the VGW transfers an IP packet to an ONT, the VGW detects, based on the ARP information, the MAC address of the destination ONT and the ID of the logical path leading to the destination ONT. When the telephone network fails, the VGW realizes communications between ONTs based on the MAC-path information. Inter-ONTs communications carried out based on the MAC-path information will be described in detail later.

The CPU/memory section 21 is provided with a TDM signaling function 211 based on GR303, a packet signaling function 212 based on H.248 and SIP, and an inter-work function 213 for connecting the TDM signaling function 211 and the packet signaling function 212. These functions are installed by software. The VGW has directory information 218 and active call information 219 provided by the interwork function 213, the directory information 218 including telephone number information on subscribers' telephones and the active call information 219 including information on active calls. These pieces of information enable the VGW to keep active calls active when the telephone network fails and connect new calls even after the telephone network failure.

As shown in FIG. 7, the directory information 218 relates a CRV (call reference value) which is an identifier assigned to each telephone line (POTS line) accommodating a subscriber's telephone, a POTS line name, a telephone number (directory number), and the IP address of the ONT to which the POTS line belongs. As shown in FIG. 8, the active call information 219 relates caller information and callee information. The caller information and the callee information each includes a CRV which is an identifier assigned to the telephone line to which the relevant subscriber's telephone belongs, the corresponding POTS line name, the time slot number of the time slot used by the TDM line between the VGW and the telephone switch, and information on the RTP session conducted between the VGW and the ONT to which the relevant subscriber belongs.

Figure 11:
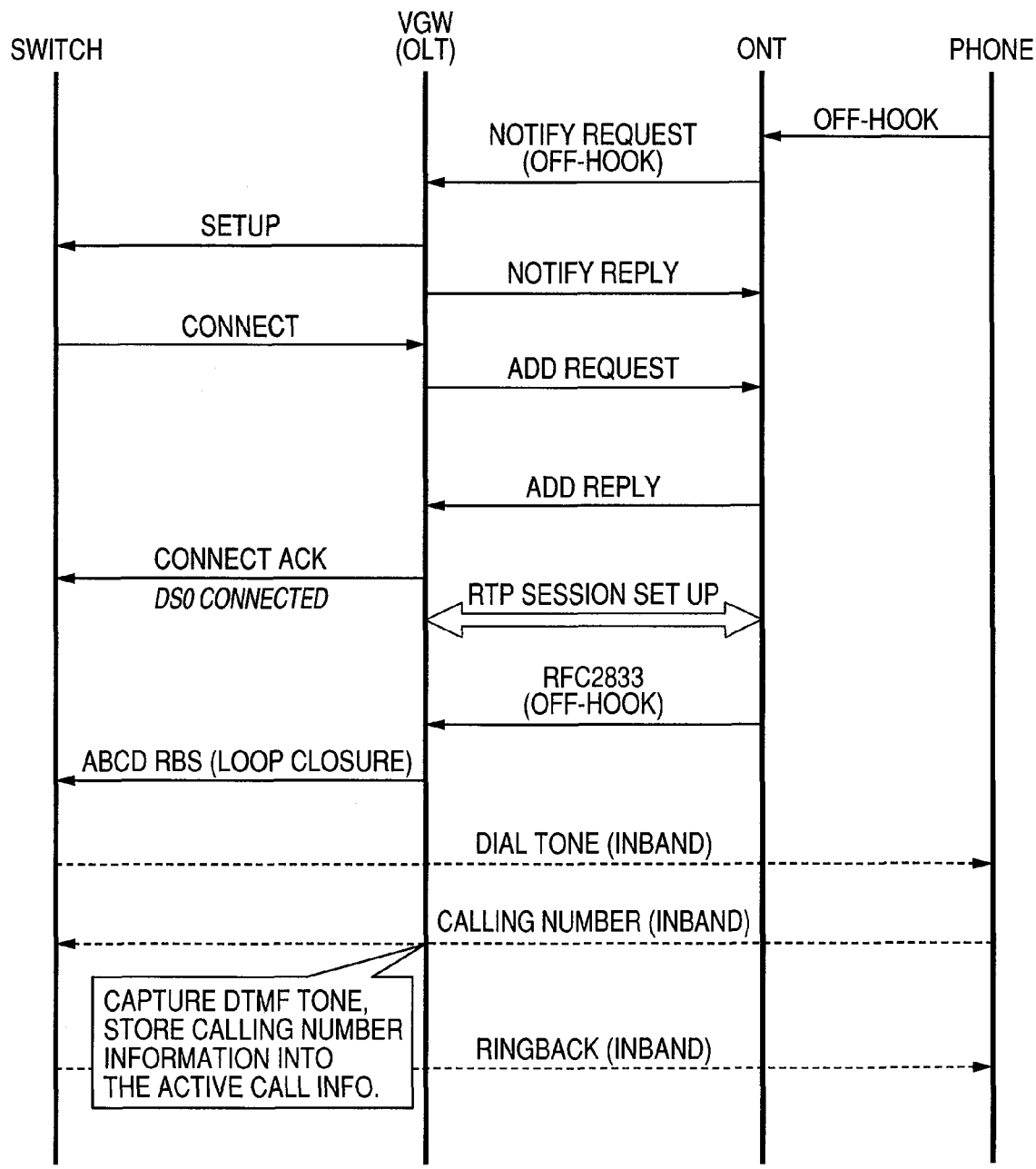
FIG. 11 is a diagram showing an outgoing call sequence.

FIG. 11 is a sequence diagram showing signaling information exchanges carried out, when a call is made, among a calling subscriber, the corresponding ONT, the VGW, and the telephone switch. In this example, H.248 and RFC2833 are used as signaling protocols between the ONT and the VGW. Referring to FIG. 11, when a subscriber picks up a telephone receiver, the ONT detects an off-hook event of the telephone. The ONT having detected the off-hook event notifies the VGW of the off-hook event by sending an H.248 NOTIFY Request message to the VGW. When the NOTIFY Request (Off-Hook) message is received, the VGW sends a GR303 SETUP message to the telephone switch and an H.248 NOTIFY Reply message to the ONT. When the GR303 SETUP message is received normally, the telephone switch sends a GR303 CONNECT message to the VGW. When the GR303 CONNECT message is received, the VGW sends an H.248 ADD Request message to the ONT ordering the ONT to set up a terminal point (RTP session setup) for call data exchanges. After processing the H.248 ADD Request message properly, the ONT sends an H.248 ADD Reply message to the VGW and sets up an RTP session to exchange voice data with the VGW. When the H.248 ADD Reply message is received, the VGW assigns a time slot for use in communicating with the telephone switch and sends a GR303 CONNECT ACK message to the telephone switch. Furthermore, the VGW sets up an RTP session for exchanging voice data with the ONT and, in the TDM-packet translator, relates the time slot and the RTP session. After setting up the RTP session, the ONT sends an RFC2833 Off-Hook event message to the VGW using the RTP session. When the RFC2833 message (Off-Hook) is received, the VGW notifies the telephone switch of a Loop Closure event by an ABCD Robbed Bit Signaling method based on GR303. The above procedure sets up a voice channel between the telephone switch and the calling subscriber's telephone.

Subsequently, the telephone switch sends a dial tone to the subscriber's telephone using the voice channel set up between the telephone switch and the ONT. The subscriber recognizes the dial tone and inputs a destination telephone number into the telephone. The telephone number information is transmitted as a DTMF (dual tone multi frequency) tone to the telephone switch through the voice channel. In the case of a general VGW which is not involved in telephone number control, the DTMF tone information is transferred as voice data to the telephone switch. In the case of the VGW of the present invention, the VGW captures the DTMF tone when it is transferred to the telephone switch and, when processing an incoming call as described later with reference to the protocol sequence shown in FIG. 12, recognizes that the DTMF tone is of a local call (a call with both the caller ONT and the callee ONT connected to the relevant OLT (VGW)). Based on this arrangement, the VGW generates Active Call information for holding the active call between the subscribers' telephones. The procedure for generating Active Call information will be described later with reference to the flowchart shown in FIG. 13.

When the destination telephone number is received by means of the DTMF tone, the telephone switch sets up a voice channel between itself and the destination telephone via the telephone network. Until the destination subscriber picks up his or her telephone receiver, a ring back tone is sent from the telephone network to the caller's telephone.

Figure 26:
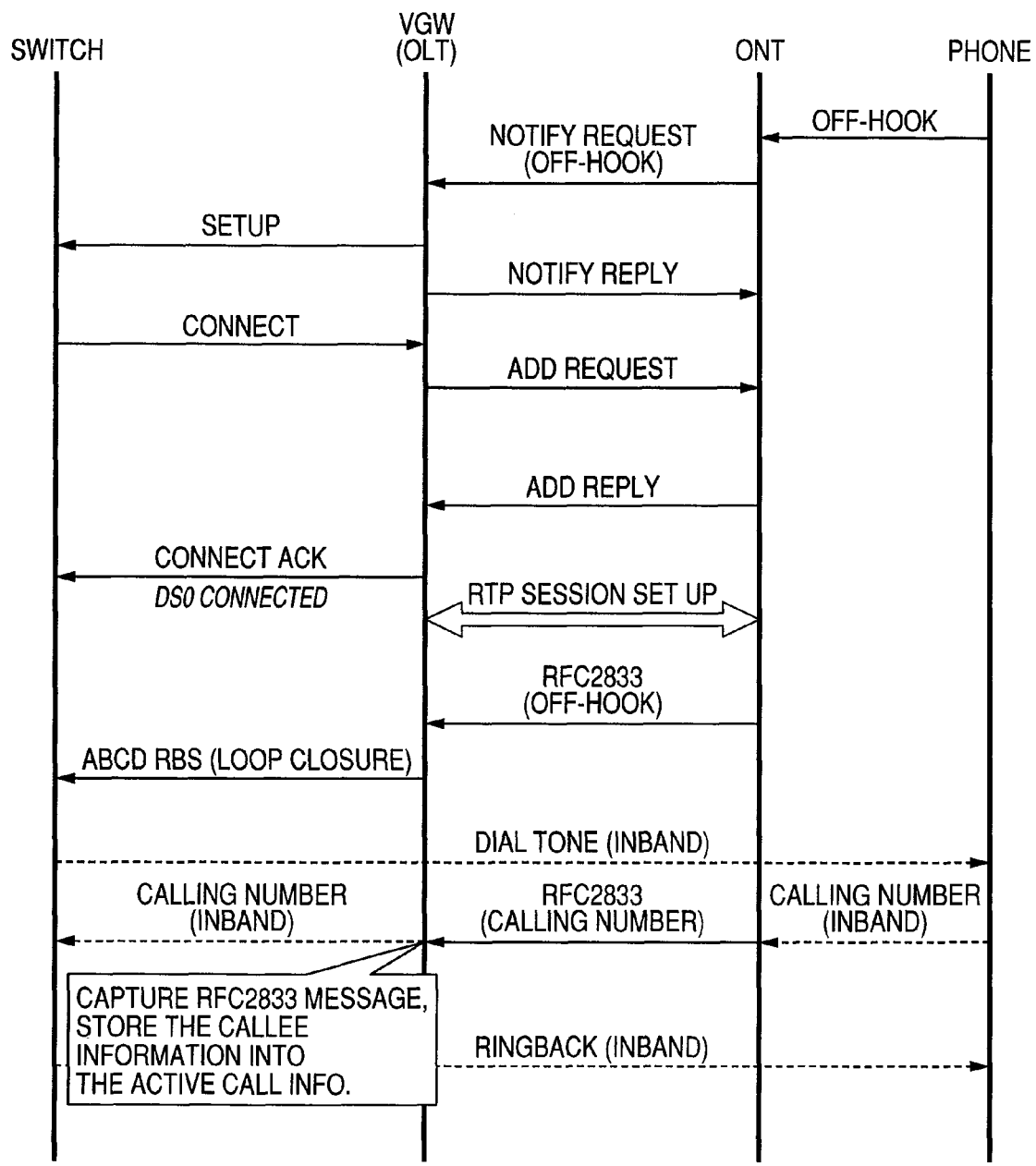
FIG. 26 is a diagram showing an outgoing call sequence in which RFC2833 messages are used for telephone number notification.

Even though, according to the sequence shown in FIG. 11, telephone number information is transferred using a DTMF tone, telephone number information may be transferred using, for example, an RFC2833 packet message. FIG. 26 shows a method of transferring telephone number information using an RFC2833 message. In an environment where large packet losses or delays occur in an IP network, a DTMF tone transferred as RTP sound information may not be accurately received on the receiving side. RFC2833 messages are used in such an environment.

Figure 12:
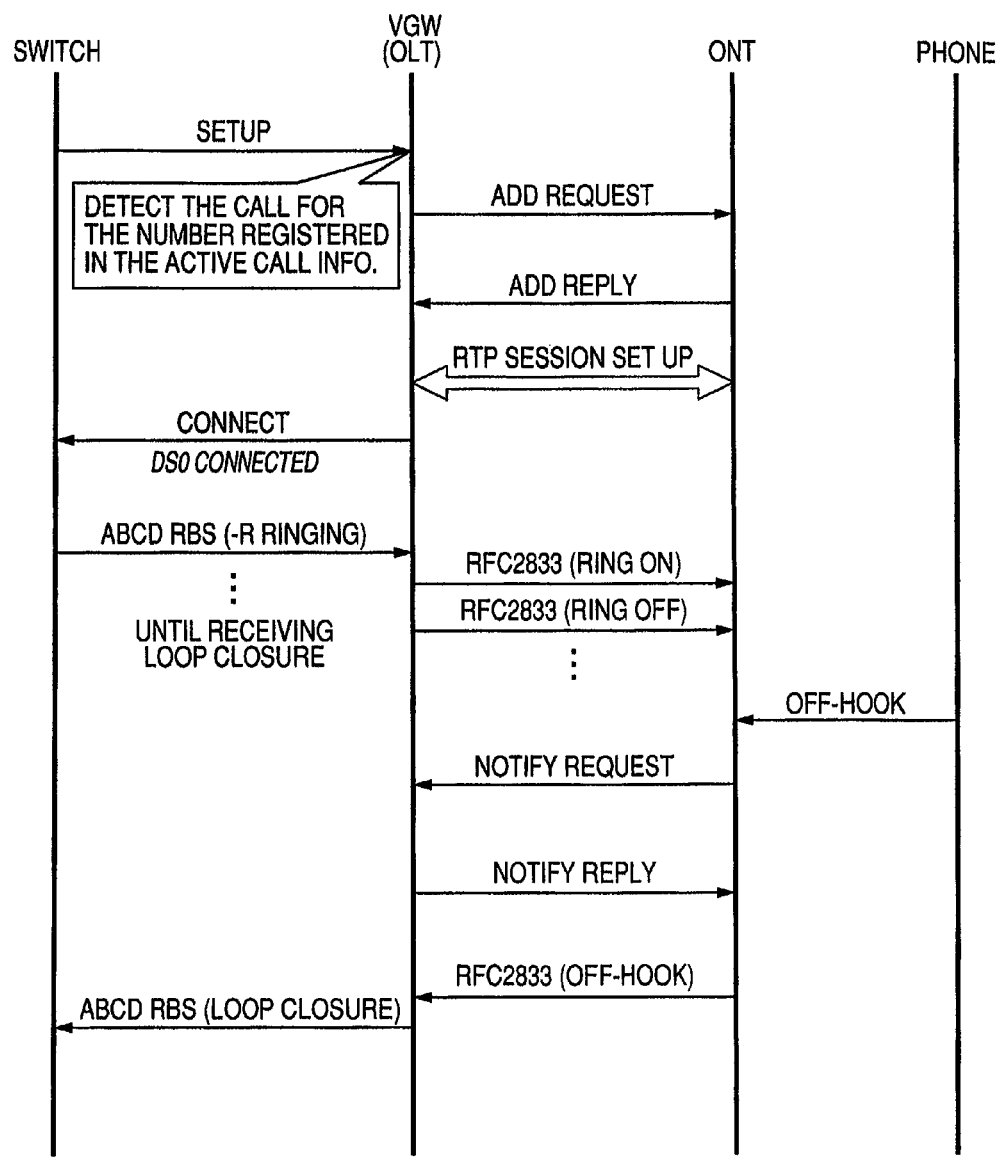
FIG. 12 is a diagram showing an incoming call sequence.

FIG. 12 is a sequence diagram showing signaling information exchanges carried out, when a call is received by a callee, among the VGW, the corresponding ONT, and the called subscriber. Referring to FIG. 12, first the VGW receives a GR303 SETUP message from the telephone switch. The VGW of the present invention searches Active Call information for the CRV that is given by the GR303 SETUP message and that identifies the called subscriber. When the caller telephone belongs to an ONT connected to the OLT that accommodates the VGW, the Active Call information has an entry which has been registered during the protocol sequence shown in FIG. 11 or that shown in FIG. 26 and which indicates the callee CRV information. The VGW of the present invention can then recognize that the active call is a local call with the caller telephone and the callee telephone each connected to an ONT connected to the VGW. The VGW having received the GR303 SETUP message sends an H.248 ADD Request message to the ONT requesting the ONT to set up a terminal point (RTP session setup) for call data exchanges. When the H.248 ADD Request message is received, the ONT sends an H.248 ADD Reply message to the VGW and sets up an RTP session. When the ADD Reply message is received, the VGW also sets up an RTP session. The VGW then sends a GR303 CONNECT message to the telephone switch and assigns a time slot. Subsequently, the VGW relates the assigned time slot and the RTP session in the TDM-packet translator. Through the above procedure, a voice channel is set up between the telephone switch and the called subscriber's telephone.

Subsequently, the telephone switch sends a request to ring the callee telephone to the VGW by the ABCD Robbed Bit Signaling method based on GR303. When the request for ringing is received, the VGW notifies the ONT of the request by sending an RFC2833 message causing the ONT to ring the called subscriber's telephone. When the called subscriber picks up the telephone receiver, the ONT detects occurrence of an Off-Hook event at the called subscriber's telephone and notifies the VGW of the Off-Hook event by sending an H.248 NOTIFY Request message to the VGW. When the H.248 NOTIFY Request message is received, the VGW sends an H.248 NOTIFY Reply message to the ONT. The ONT then sends an RFC2833 Off-Hook event message to the VGW. When the RFC2833 Off-Hook event message is received, the VGW notifies the telephone switch of the Off-Hook event by the ABCD Robbed Bit Signaling method.

Figure 13:
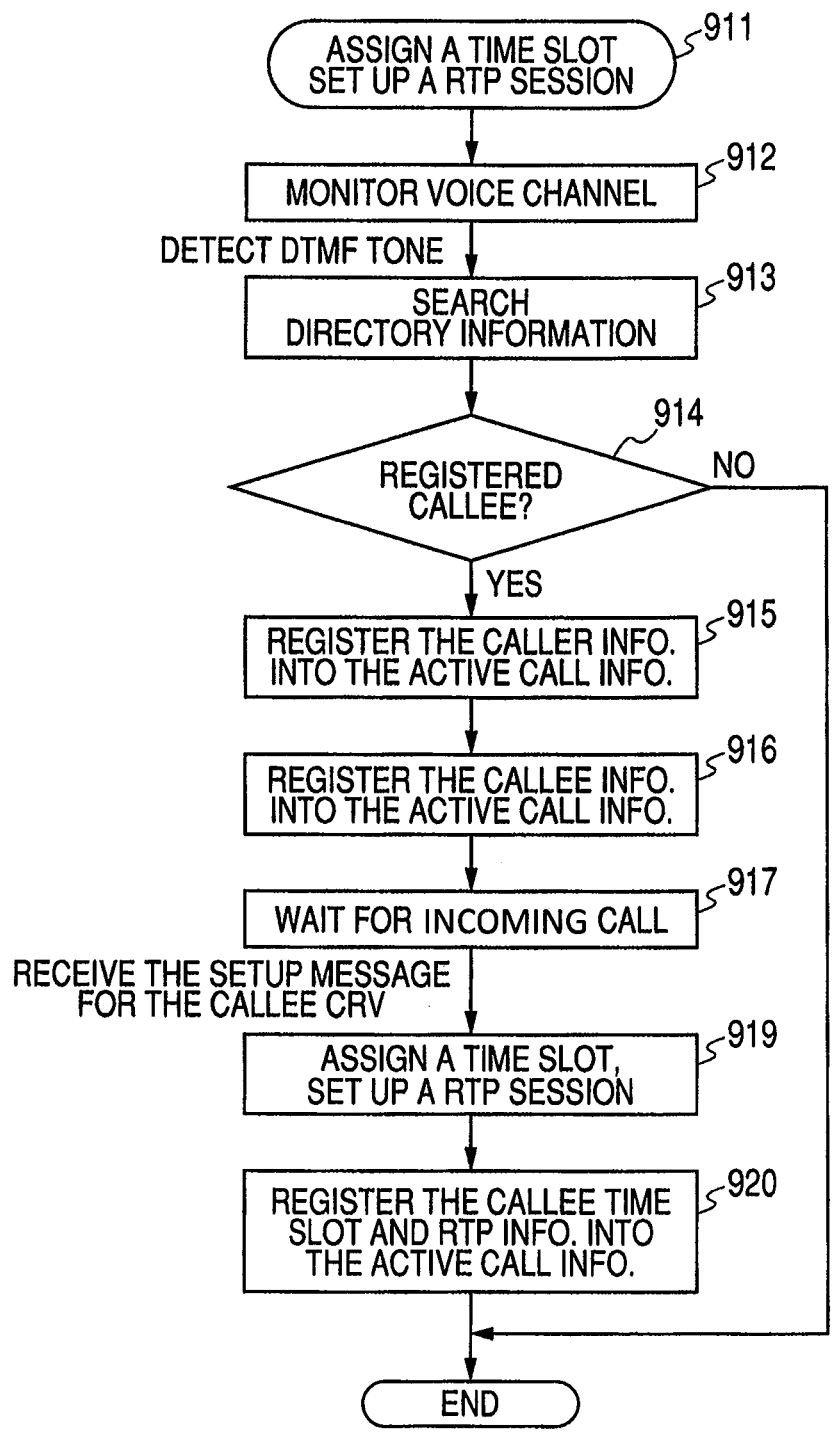
FIG. 13 is a flowchart showing an active call information generating procedure.

FIG. 13 is a flowchart showing a procedure used by the VGW to generate Active Call information during outgoing call processing and incoming call processing carried out according to the protocol sequences shown in FIGS. 11 and 12. The Active Call information generation procedure will be described below with reference to the flowchart. The procedure will be described beginning with a stage in which, in processing a call from a subscriber, a time slot has been set up as a voice channel between the VGW and the telephone switch and an RTP session has been set up as a voice channel between the VGW and the ONT. The stage corresponds to, referring to FIG. 11, when the VGW notified the telephone switch of a Loop Closure event by the ABCD Robbed Bit Signaling method.

The VGW having set up a time slot and an RTP session (step 911) enters voice channel monitoring mode and monitors the voice channel to detect a DTMF tone (step 912) which includes callee telephone number information transmitted from the ONT to the telephone switch. When a DTMF tone is detected, the VGW searches the directory information 218 for the detected callee telephone number (step 913). When the callee telephone number is found registered in the directory information, the called subscriber is recognized as a local callee under the control of the same VGW, and the VGW proceeds to register relevant information in the Active Call information. The VGW first registers caller information in the Active Call information (step 915). The CRV information to be registered is obtained by searching the directory information for the POTS line name included in the H.248 NOTIFY Request message received from the ONT. The time slot and RTP session information is obtained when the time slot and RTP session are set up in procedure step 911. The VGW next registers the callee telephone number as the callee information in the Active Call information 219 (step 916). At this stage, no RTP session has been set up between the ONT on the callee side and the VGW, and no time slot has been assigned between the VGW and the telephone switch, so that the callee information registered in the Active Call information includes neither time slot information nor RTP session information. Since the call being processed is a local call under the control of the VGW, the telephone switch processes the incoming call to loop it back to the VGW. Hence, the VGW enters a state of waiting for the incoming local call (step 917) so as to detect the processing of the incoming call. When a SETUP message is received from the telephone switch, the VGW searches the Active Call information to detect the local call based on the CRV included in the SETUP message. When the local call is detected, the VGW registers information on the time slot and RTC session that have been assigned and set up (step 919) for the incoming call in the Active Call information (step 920). The above procedure completes generation of the Active Call information.

Figure 14A:
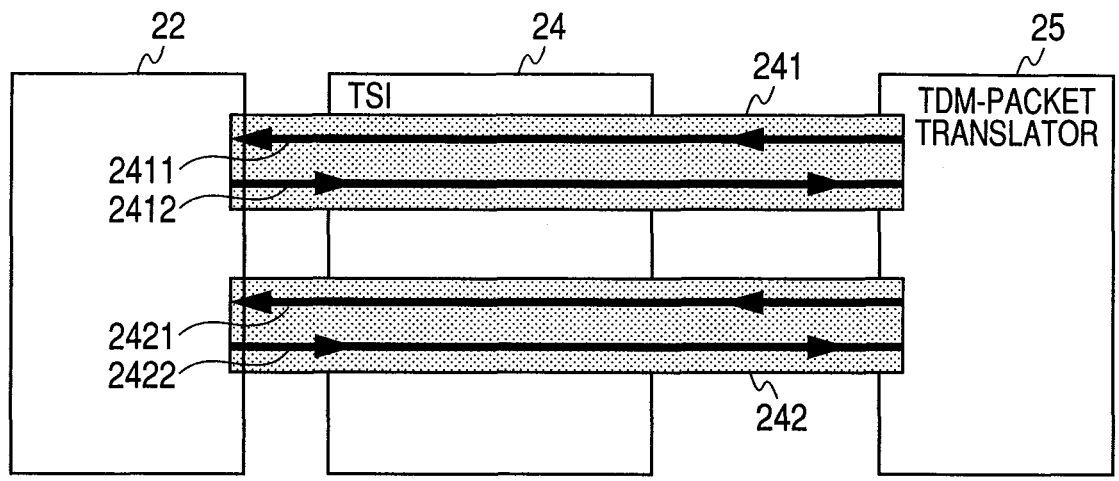
FIG. 14A and FIG. 14B are diagrams each showing setting up of time slots.
Figure 14B:
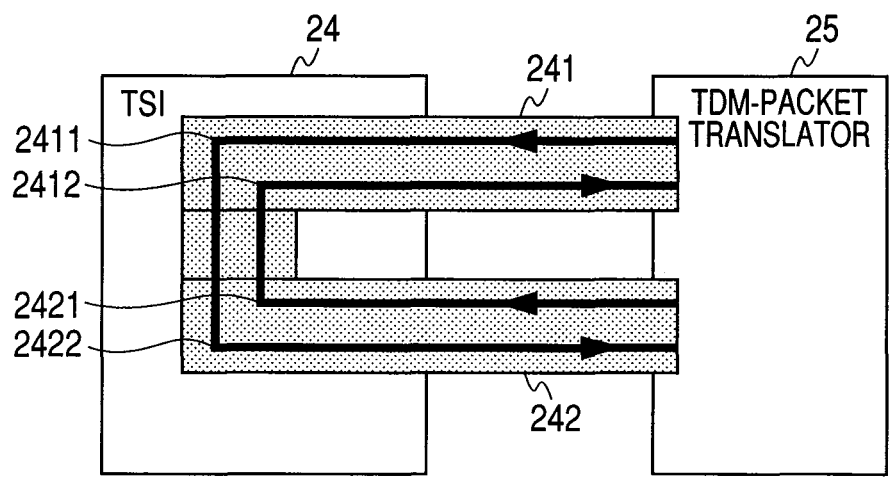

In the following, how the VGW keeps an active call active when the telephone network fails will be described. Referring to FIG. 1, when the telephone switch 41 or the line 42 connecting the telephone switch 41 and the VGW fails, the VGW 2 detects the failure based on an error signal or abnormality of data received through the line 42. Upon detection of a failure, the VGW 2 interconnects, in the TSI 24 shown in FIG. 6, the time slots between the two parties of an active call to loop back the voice data exchanged between them. The time slot being used by each of the two parties is recorded as time slot information in the Active Call information 219. FIGS. 14A and 14B illustrate how the two time slots are connected for voice data looping back. FIG. 14A shows the two time slots in a state of normal operation. In the state shown in FIG. 14A, time slot channels 241 and 242 are relayed by the TSI 24 located between the TDM-packet translator 25 and the TDM interface 22. The time slot channels 241 and 242 are full duplex channels. For the time slot channel 241, a bit string from the TDM-packet translator is denoted by reference numeral 2411, and a bit string to the TDM-packet translator is denoted by reference numeral 2412. Similarly, for the time slot channel 242, a bit string from the TDM-packet translator is denoted by reference numeral 2421, and a bit string to the TDM-packet translator is denoted by reference numeral 2422. FIG. 14B shows the time slots interconnected, upon occurrence of a failure, in the TSI 24 to loop back the voice data exchanged between the caller and callee. In the state shown in FIG. 14B, the time slot channels 241 and 242 are interconnected. Assume that conversation is held between the telephones 6a and 6d as shown in FIG. 1 and that the time slot channels 241 and 242 are used for voice data transfers between the telephone 6a and the telephone switch 41 and between the telephone 6d and the telephone switch 41, respectively. When a failure develops, the time slot channels 241 and 242 are connected in the TSI 24 as shown in FIG. 14B causing the bit string 2411 to be looped back to the bit string 2422 and the bit string 2421 to be looped back to the bit string 2412. In this arrangement, the voice from the telephone 6a is looped back to the telephone 6d, and the voice from the telephone 6d is looped back to the telephone 6a. In this way, the VGW can keep an active call active even when the telephone network fails.

All the time slots that have been in use by non-local calls are released when the telephone network fails.

Figure 15:
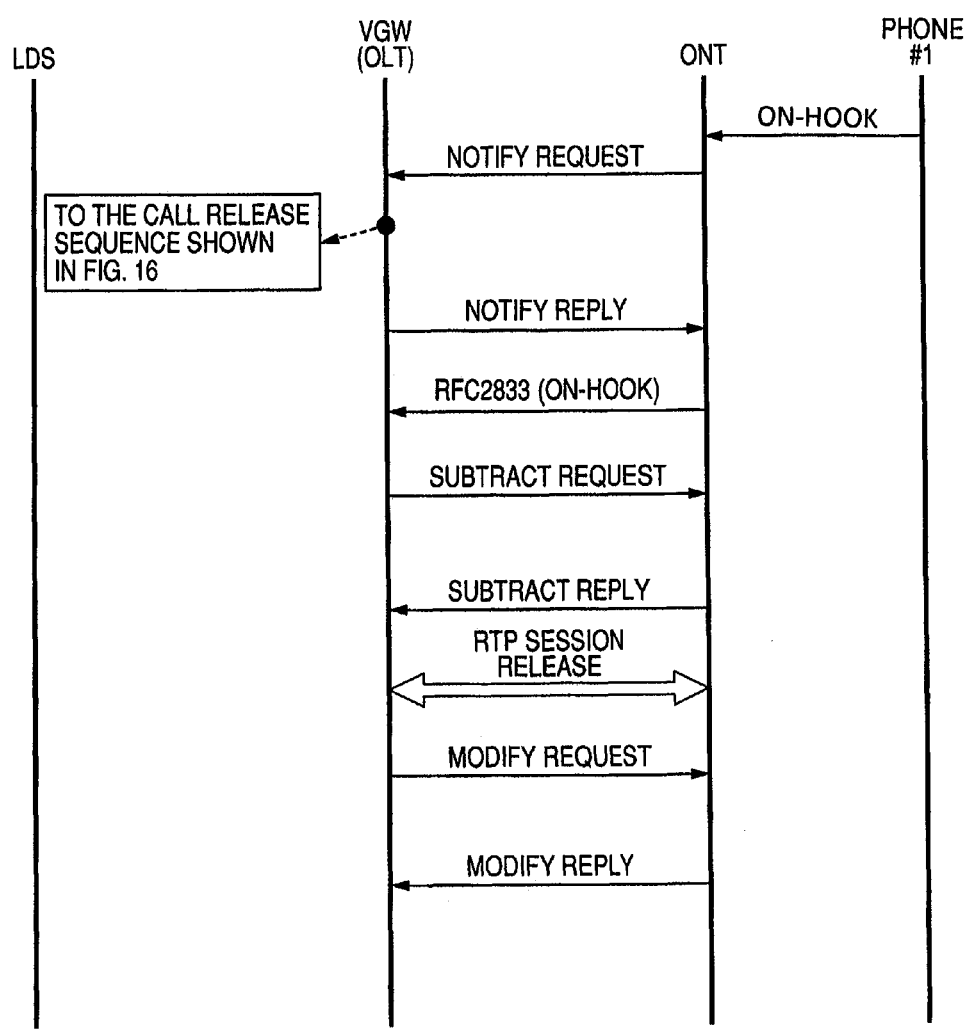
FIG. 15 is a flowchart 1 showing a call release sequence performed after occurrence of a failure.
Figure 16:
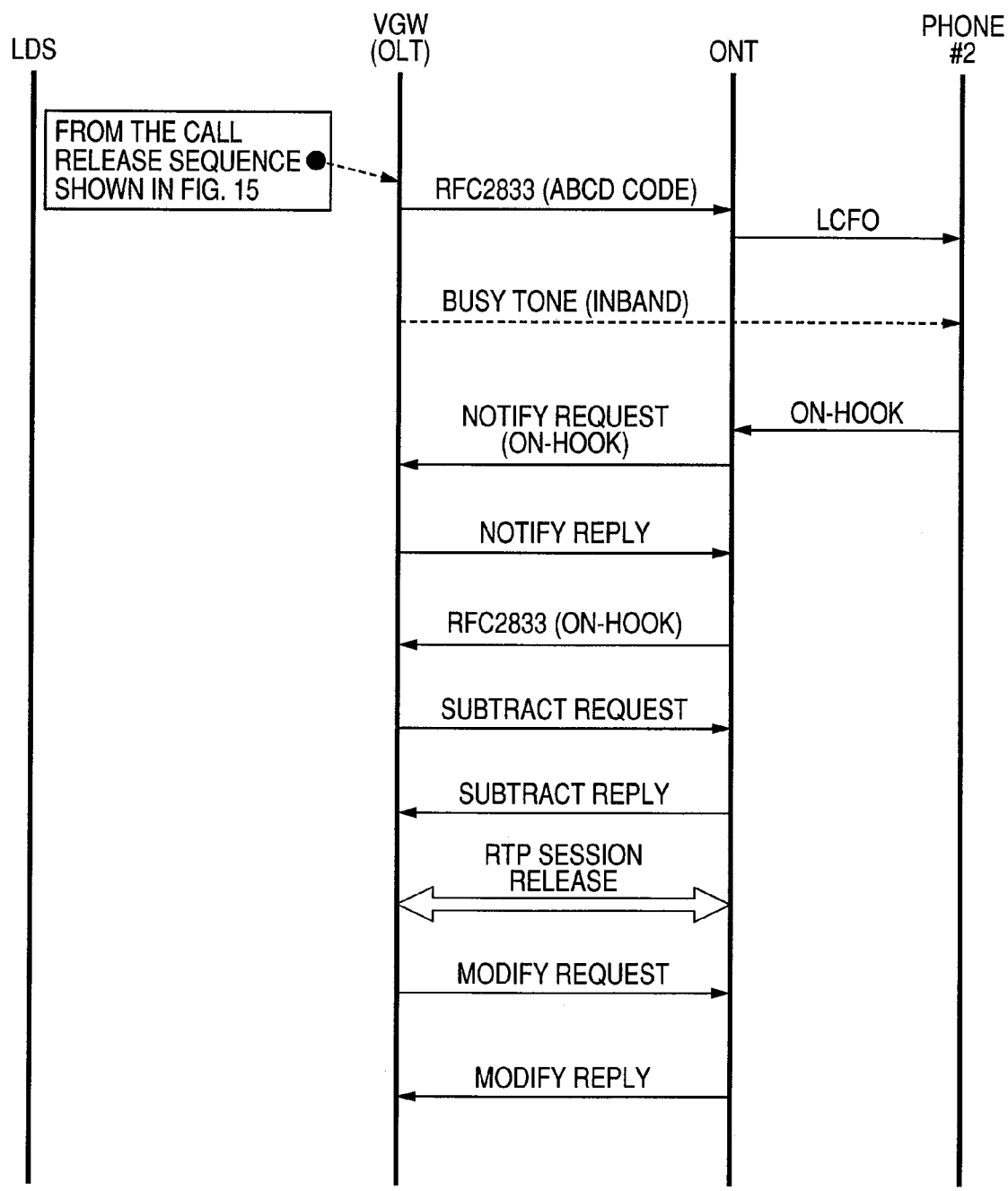
FIG. 16 is a flowchart 2 showing a call release sequence performed after occurrence of a failure.

Next, how a call which has been kept active is released will be described with reference to FIGS. 15 and 16. FIG. 15 is a sequence diagram showing a protocol procedure performed when a subscriber finishes talking using telephone #1 and hangs up its receiver. When the receiver is hung up, the ONT detects an On-Hook event of the telephone. The ONT having detected the On-Hook event sends an H.248 NOTIFY Request message to the VGW. When the message is received, the VGW returns an H.248 NOTIFY Reply message to the ONT and, at the same time, starts a call release protocol procedure, shown in FIG. 16, for the telephone #2 used by the other party of the telephone conversation that has been finished. FIG. 16 will be described later. The ONT having received the H.248 NOTIFY Reply message sends an RFC2833 On-Hook event message to the VGW. When the RFC2833 (On-Hook) event message is received, the VGW sends an H.248 Subtract Request message to the ONT. When the message is received, the ONT returns an H.248 Subtract Reply message to the VGW and releases the RTP session. When the H.248 Subtract Reply message is received, the VGW also releases the RTP session and sends an H.248 Modify Request message to the ONT to have the relevant POTS line of the ONT reset. When the message is received, the ONT resets the POTS line making the line ready for a new call connection and returns an H.248 Modify Reply message to the VGW.

The call release protocol procedure, shown in FIG. 16, for the telephone #2 used by the other party of the telephone conversation will be described below. As described above, when an On-Hook event of the telephone #1 occurs, the VGW sends an RFC2833 LCFO (line current feed open) message to the ONT to which the telephone #2 belongs. When the message is received, the ONT puts the relevant POTS line in an LCFO state and notifies the telephone #2 that the telephone #1 was hung up. Furthermore, the VGW sends a busy tone to the telephone #2 using the tone generator 26 shown in FIG. 6. When the busy tone is heard, the subscriber using the telephone #2 hangs up the receiver of the telephone #2 causing the ONT to be notified of the On-Hook event. The ONT then sends an H.248 NOTIFY Request message to the VGW to notify the VGW of the On-Hook event. When the message is received, the VGW returns a NOTIFY Reply message to the ONT. Furthermore, the ONT sends an RFC2833 On-Hook message to the VGW. When the RFC2833 (On-Hook) event message is received from the ONT, the VGW sends an H.248 Subtract Request message to the ONT. When the message is received, the ONT returns an H.248 Subtract Reply message to the VGW and releases the RTP session. The VGW having received the H.248 Subtract Reply message also releases the RTP session and sends an H.248 Modify Request message to the ONT to have the relevant POTS line of the ONT reset. When the message is received, the ONT resets the POTS line making the line ready for a new call connection and returns an H.248 Modify Reply message to the VGW.

Figure 17:
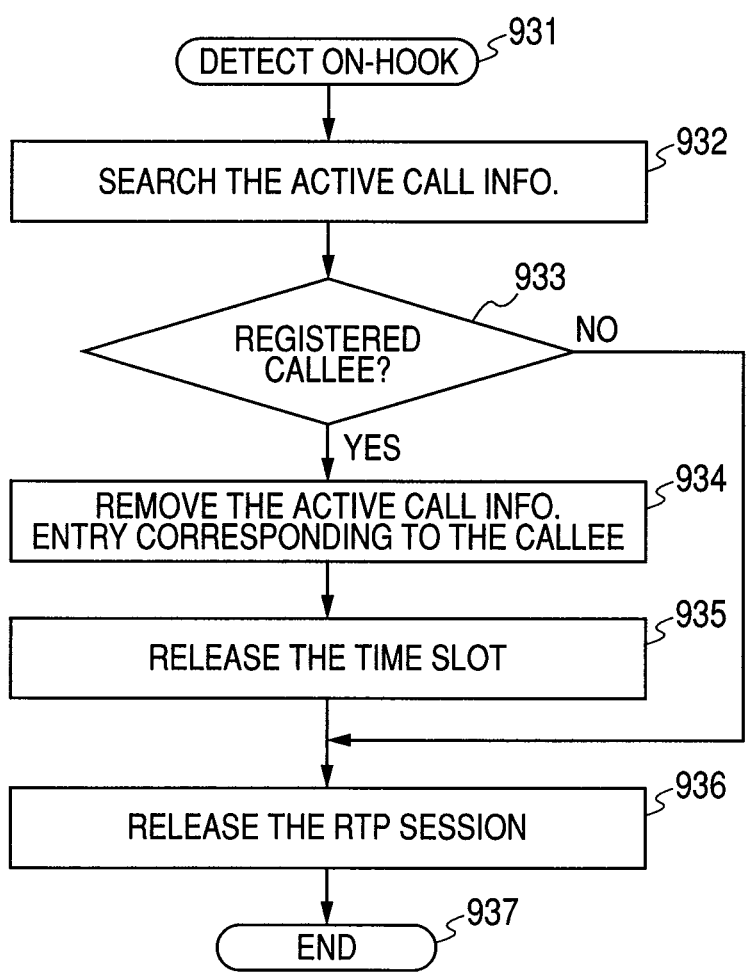
FIG. 17 is a flowchart showing an active call information removal procedure performed when a call is released.

FIG. 17 is a flowchart showing a procedure for Active Call information removal and resource releasing to be performed when a call is released as described above. When the VGW detects, by receiving an H.248 NOTIFY Request message (step 931), an On-Hook event caused by a subscriber, it searches the Active Call information for the Callee registration related with the POTS line name given by the message (step 932). When the Callee registration is found (step 933), the VGW removes the corresponding entry (step 934). Furthermore, the VGW releases, in the TSI 24 shown in FIG. 14, the time slot assigned to the call (step 935) and the RTP session set up for the call (step 936) thereby terminating the procedure (step 937). If the callee registration is not found (step 933), there may be an RTP session left set up for a non-local call released when the telephone network failed. In this case, too, the VGW releases the RTP session (step 936) and terminates the procedure (step 937). In this way, the VGW releases the call kept active when the telephone network failed.

Figure 18:
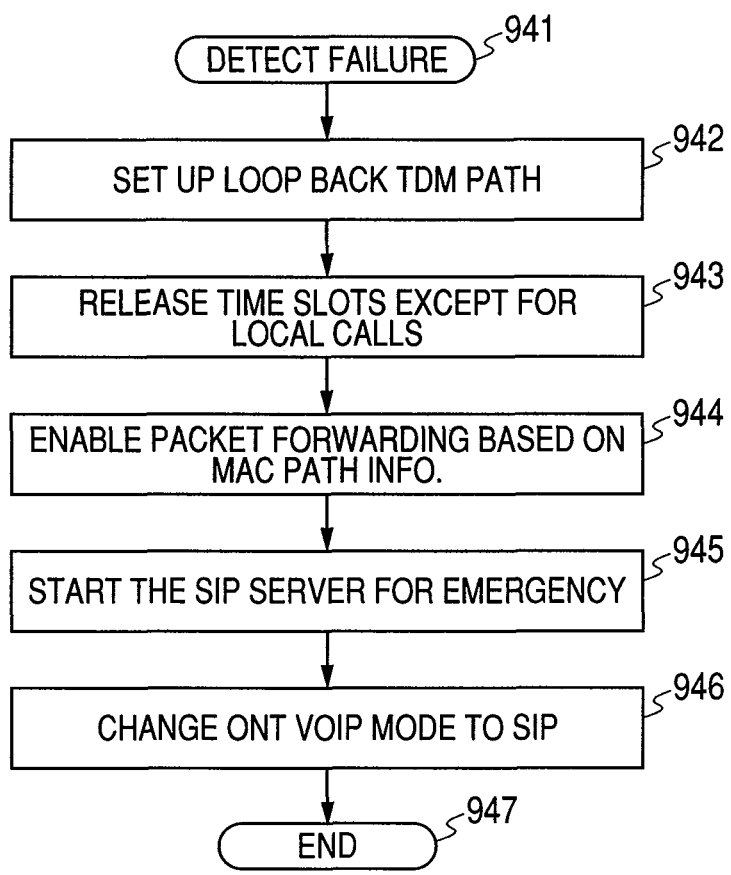
FIG. 18 is a flowchart showing a procedure for entering standalone operation mode.

FIG. 18 is a flowchart showing whole processing performed by the VGW to cope with a telephone network failure. As described above, when the VGW detects a telephone network failure (step 941), it sets up loopback paths for the time slots assigned to local calls (step 942) and releases the time slots assigned to non-local calls (step 943). Furthermore, to make itself ready to process new calls, the VGW proceeds as follows. First, it enables loopback processing in the packet interface 23 shown in FIG. 6 (step 944). Next, it starts the SIP server denoted by the reference numeral 212 in FIG. 6 (step 945). Finally it broadcasts a message for switching all ONTs into SIP mode to the ONTs (step 946) and terminates the procedure (step 947). The procedures for enabling loopback processing and switching the ONTs into SIP mode will be described below.

Figure 19:
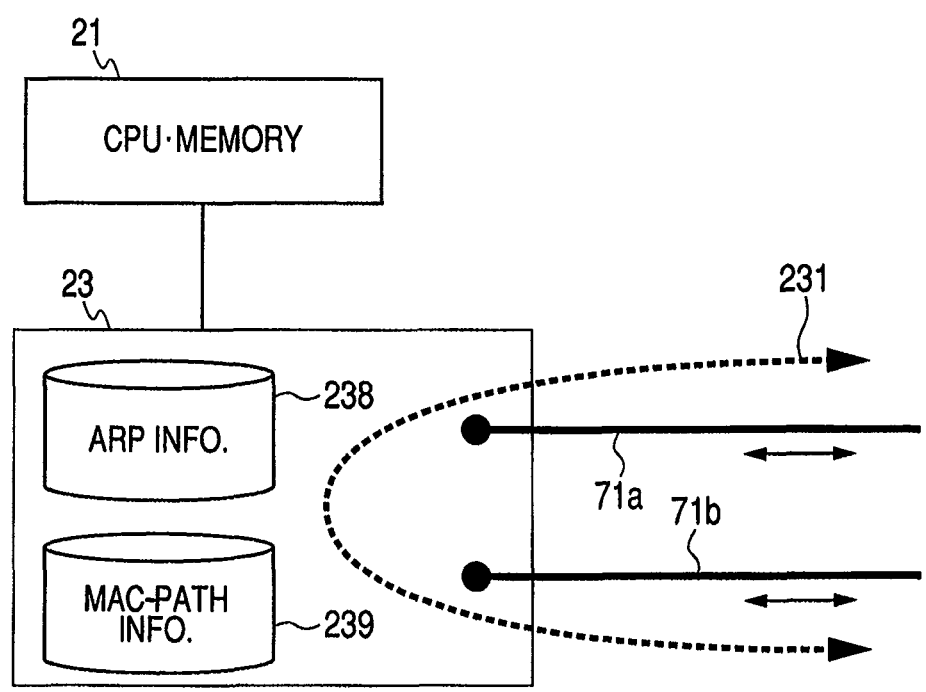
FIG. 19 is a diagram showing looping back of packets at a packet interface.

A new call started after occurrence of a network failure is to be looped back at the packet interface 23. Assume that the packet interface 23 accommodates the logical paths 71a and 71b as shown in FIG. 19 and that the logical paths 71a and 71b are connected to the ONTs 3a and 3b, respectively, as shown in FIG. 3. A voice packet sent from a subscriber belonging to the ONT 3a to a subscriber belonging to the ONT 3b is looped back at the packet interface 23 as described below.

The packet interface 23 has the ARP information 238 that gives the correspondences between the IP addresses and MAC addresses of ONTs. When, after occurrence of a network failure, an ARP request is received from an ONT requesting notification of the MAC address of another ONT, the VGW responds to the request on behalf of the another ONT. In a case where the ONT 3a sends an IP packet to the ONT 3b, for example, the ONT 3a requiring to know the MAC address of the ONT 3b sends out an ARP request which is a request for converting the IP address of the ONT 3b to a MAC address. The MAC address is required in generating an Ethernet frame for use by the packet switch in the OLT. When the VGW receives the ARP request, the VGW reports the MAC address of the ONT 3b to the ONT 3a on behalf of the ONT 3b. The VGW can do so, as the correspondence between the IP address and the MAC address of the ONT 3b can be known from the ARP information 238.

When an Ethernet frame is received from an ONT, the packet interface 23 loops the Ethernet frame back using the MAC-path information 239 that gives the correspondences between the MAC addresses of ONTs and logical paths. When, for example, an Ethernet frame is received from the ONT 3a via the logical path 71a, the packet interface 23 searches the MAC-path information for the destination address of the Ethernet frame to obtain the path ID corresponding to the destination MAC address. The path ID identifies the logical path connected to the ONT 3b. Transferring the Ethernet frame to the logical path causes the Ethernet frame to be transferred to the ONT 3b.

The IP packet sent from an ONT to the SIP server is addressed to the VGW. Its MAC address is unique to the VGW. Hence, an Ethernet frame having a MAC address corresponding to the VGW is received by the VGW. The VGW transfers the Ethernet frame to the CPU/memory section 21.

Figure 20:
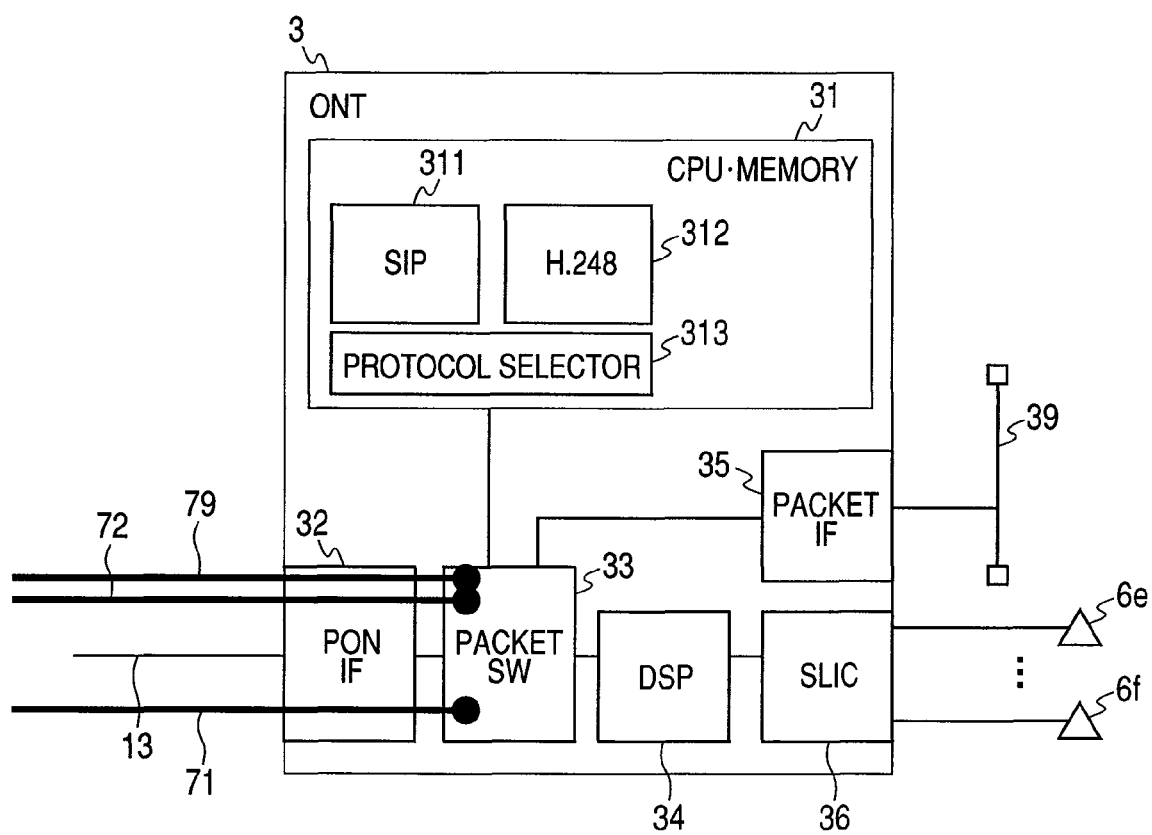
FIG. 20 is a diagram showing an ONT configuration.

FIG. 20 shows an example configuration of an ONT 3 according to the present invention. The ONT 3 includes a PON interface 32, a packet switch 33, a DSP (digital signal processor) 34 which converts a voice data packet into voice and vice versa, an SLIC (serial lie interface circuit) 36 accommodating telephones 6e to 6f, a packet interface 35 accommodating a subscriber's LAN (local area network) 39, and a CPU/memory section 31 which performs protocol processing. The CPU/memory section 31 has an H.248 client function 312 and an SIP client function 311 which are signaling functions. It also has a protocol selector 313 having a function to switch between H.248 and SIP according to a direction given by the VGW. These signaling functions and the protocol selector function are installed by software.

Figure 21:
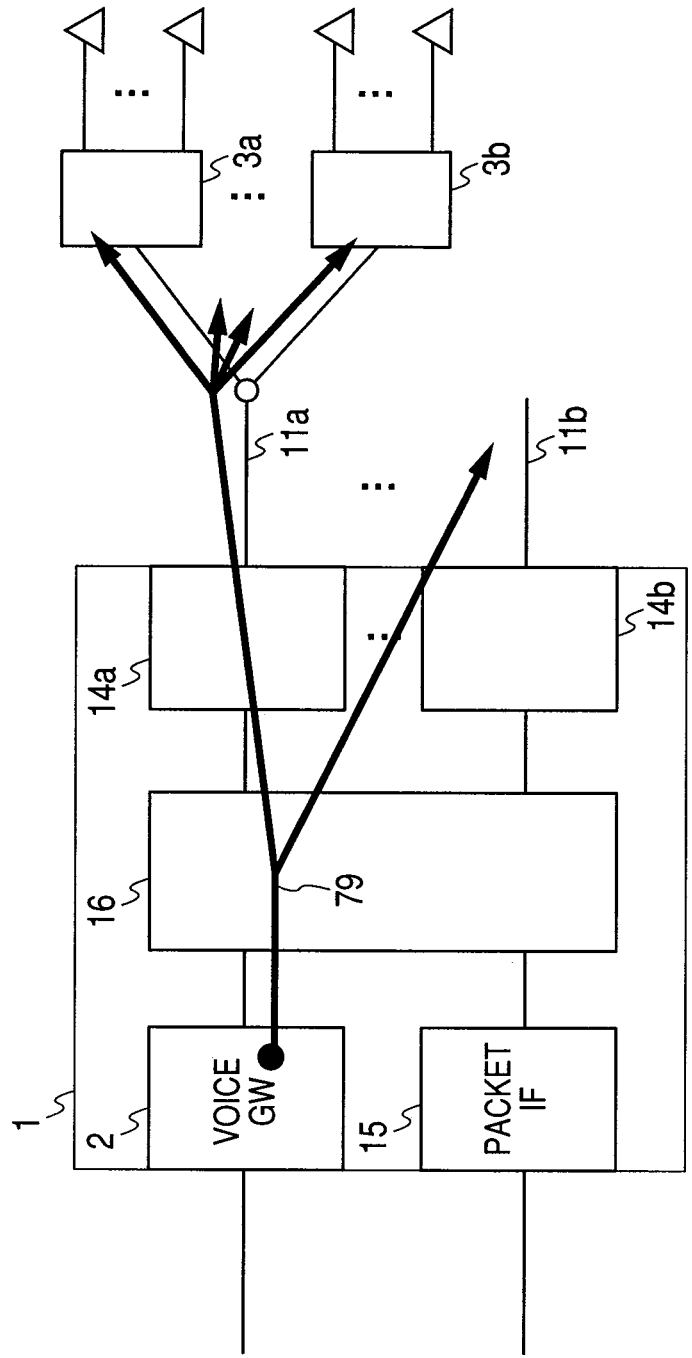
FIG. 21 is a diagram showing a multicast path for ONT control.

Referring to FIG. 20, logical paths 71, 72, and 79 are for use by the ONT 3. The logical path 71 is used for communications between the ONT and the VGW. The logical path 72 is used for communications between the ONT and the packet interface 15 of the OLT shown in FIG. 3. It is required when communicating with the IP network 5. The logical path 79 is used to receive directions for the protocol selector function 313 from the VGW. FIG. 21 shows the logical path 79 that the VGW 2 uses when sending a control message to plural ONTs 3a to 3b, the control message being for switching the signaling protocol from H.248 for use in a normal state to SIP for use when the telephone network fails. The logical path 79 is a multicast path which is set up between the VGW 2 and the ONTs 3a to 3b. The VGW 2, by broadcasting control messages to all ONTs using the multicast path, can control the ONTs simultaneously. When a control message is broadcast using the multicast path, the packet switch 79 copies the control message received from the VGW 2 for PON interfaces 14a to 14b. The control messages transferred from the PON interfaces are copied, as optical signals, by splitters 11a to 11b for distribution to all ONTs.

Figure 22:
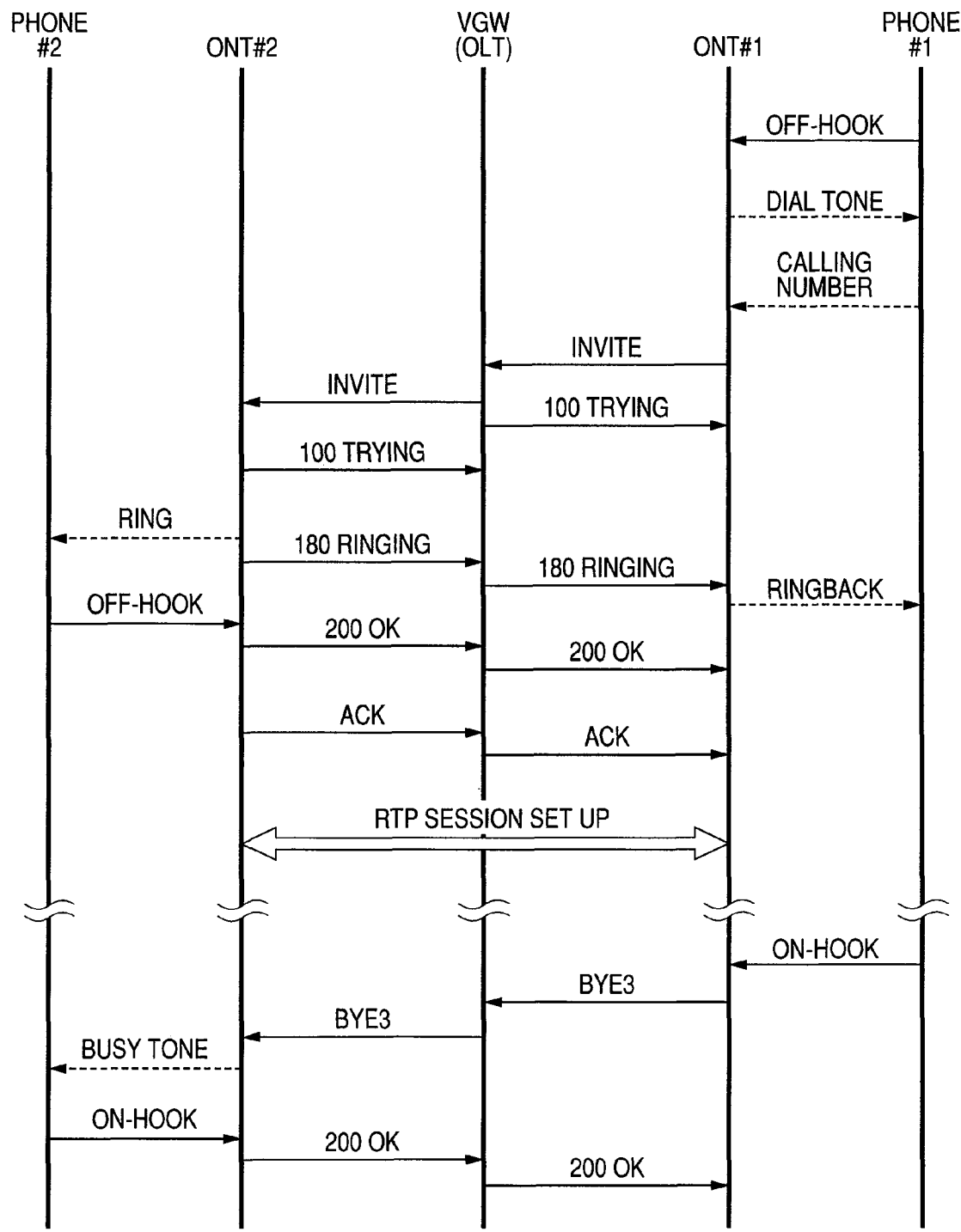
FIG. 22 is a sequence diagram showing processing of a call performed using an SIP when a failure occurs.

FIG. 22 is a diagram showing an SIP protocol sequence to be performed when making a call from a telephone #1 controlled by a VGW to a telephone #2 controlled by the same VGW and another SIP protocol sequence to be performed when ending the call. When the ONT #1 detects an Off-Hook event of the telephone #1, it sends a dial tone to the telephone #1. When the dial tone is heard, the subscriber using the telephone #1 inputs a destination telephone number to the telephone #1. When the telephone number is received, the ONT #1 sends an INVITE message to the VGW notifying the VGW of the telephone number. The SIP server of the VGW searches the directory information 218 for the IP address of the ONT corresponding to the telephone number, and sends the INVITE message to the corresponding ONT, i.e. the ONT #2. The VGW also returns a 100 Trying message, indicating that the call is being processed, to the ONT #1. When the ONT #2 receives the INVITE message, it returns a 100 Trying message, indicating that the call is being processed, to the VGW. The ONT #2 then rings the telephone #2 and sends a 180 ringing message, indicating that the telephone #2 is being rung, to the VGW. When the 180 Ringing message is received, the VGW transfers it to the ONT #1. The ONT #1 then sends a Ringback tone to the telephone #1. When the subscriber using the telephone #2 picks up the receiver, the ONT #2 detects an Off-Hook event of the telephone #2 and sends a 200 OK message and an ACK message to the VGW. When the messages are received, the VGW transfers them to the ONT #1. After the above procedure is completed, an RTP session is set up between the ONT #1 and ONT #2. With the RTP session set up between the ONT #1 and ONT #2, the RTP data belonging to the RTP session is looped back, as an Ethernet frame, by the packet interface 23.

Next, a call release protocol sequence performed when a call is ended will be described also with reference to FIG. 22. When the subscriber using the telephone #1 hangs up the receiver, the ONT #1 detects an On-Hook event and sends a BYE3 message to the VGW. When the message is received, the VGW transfers it to the ONT #2. The ONT #2 then sends a busy tone to the telephone #2. When the subscriber using the telephone #2 hangs up the receiver, the ONT #2 detects an On-Hook event and sends a 200 OK message to the VGW. The VGW then transfers the message to the ONT #1.

The voice gateway of the first embodiment can keep, when the telephone network fails, an active call active between telephones belonging to ONTs connected to an OLT and make a new call connection between telephones belonging to ONTs connected to the OLT.

Second Embodiment

Figure 23:
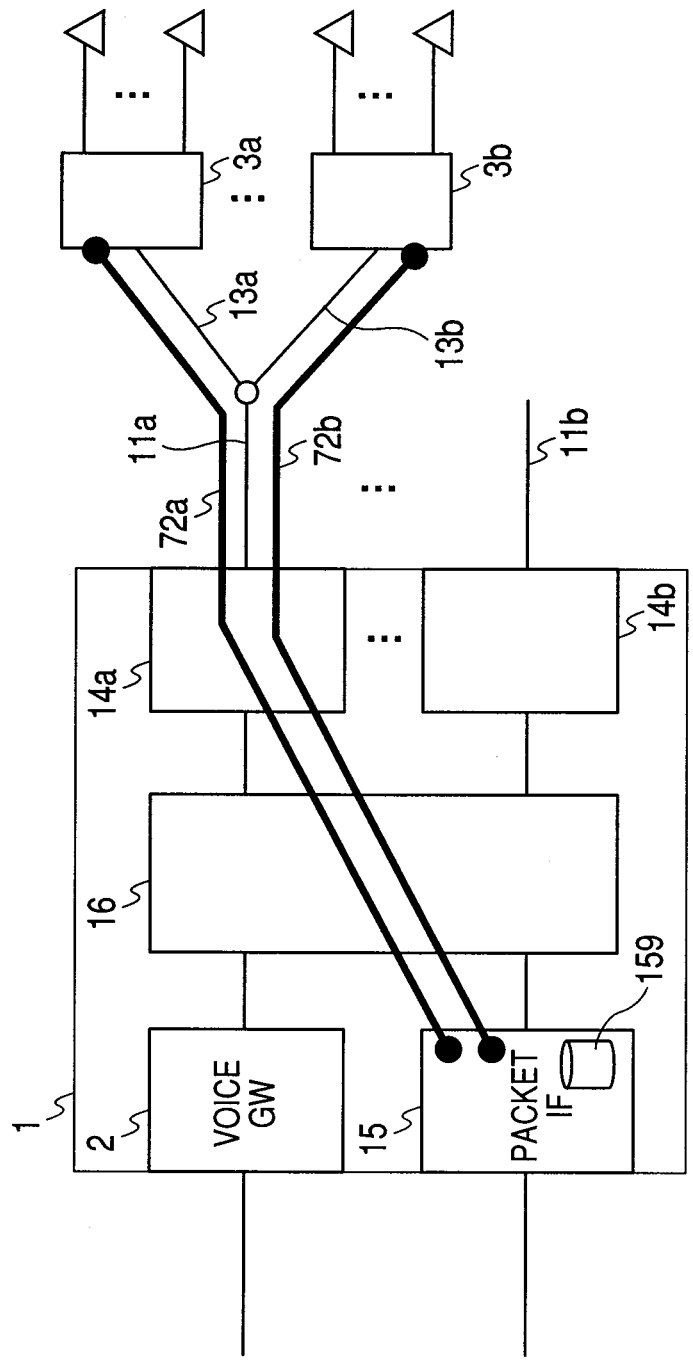
FIG. 23 is a diagram showing logical paths set up between a packet interface of an OLT and ONTs according to a second embodiment of the present invention.
Figure 24:
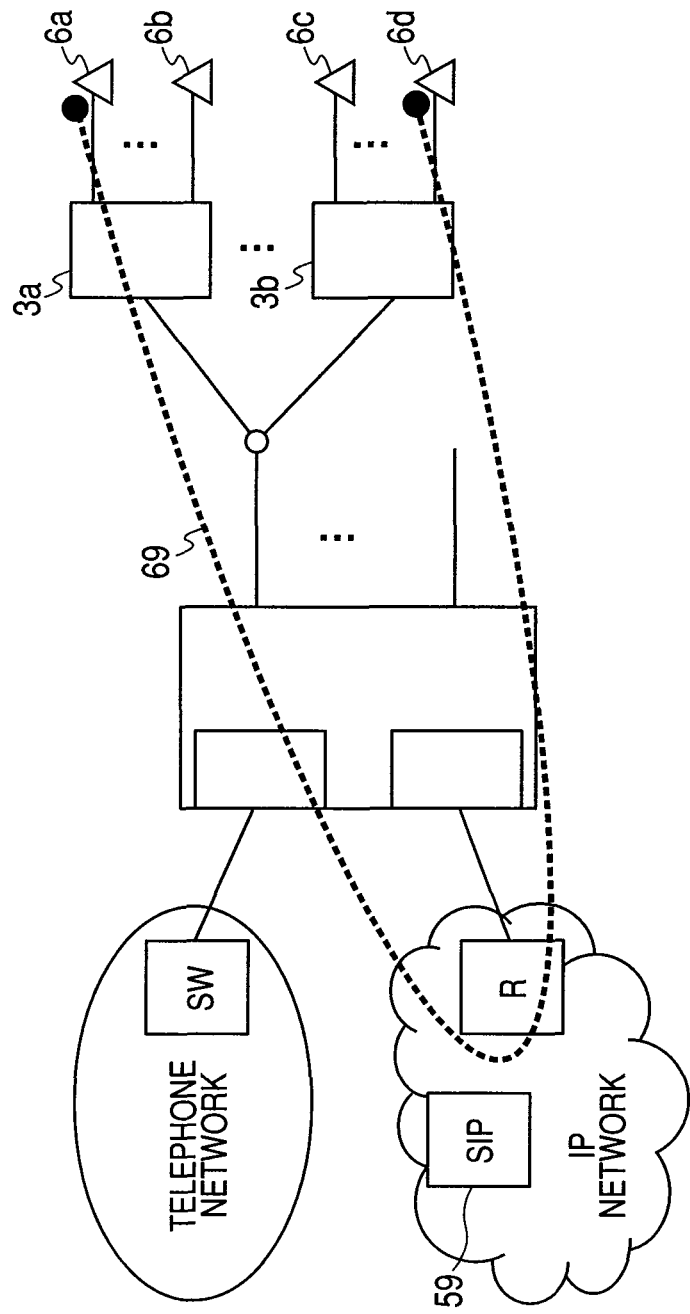
FIG. 24 is a diagram showing how a call is processed when a failure occurs according to the second embodiment.

FIG. 23 shows a second embodiment of the present invention. The second embodiment differs from the first embodiment in that an SIP server function is realized not in the VGW 2 but in an SIP server 59 included in an IP network 5. In FIG. 24, reference numeral 69 denotes a flow of telephone voice data between a telephone 6a belonging to an ONT 3a and a telephone 6b belonging to an ONT 3b. In this embodiment, the voice data is looped back in the IP network 5. Therefore, as shown in FIG. 23, a logical path for transferring voice data is set up between a packet interface 15 included in an OLT 1 and each of the ONTs 3a to 3b. In the example shown in FIG. 23, a logical path 72a is set up between the packet interface 15 and the ONT 3a, and a logical path 72b is set up between the packet interface 15 and the ONT 3b. To enable packets to be transferred from the packet interface 15 to the ONTs, MAC-path information 159 is included in the packet interface 15 of the OLT 1. The MAC-path information 159 includes information similar to that included, as shown in FIG. 9, in the MAC-path information 239 included in the VGW of the first embodiment. The correspondences between the MAC addresses of ONTs and logical path IDs are defined when the logical paths are initially set up.

Figure 25:
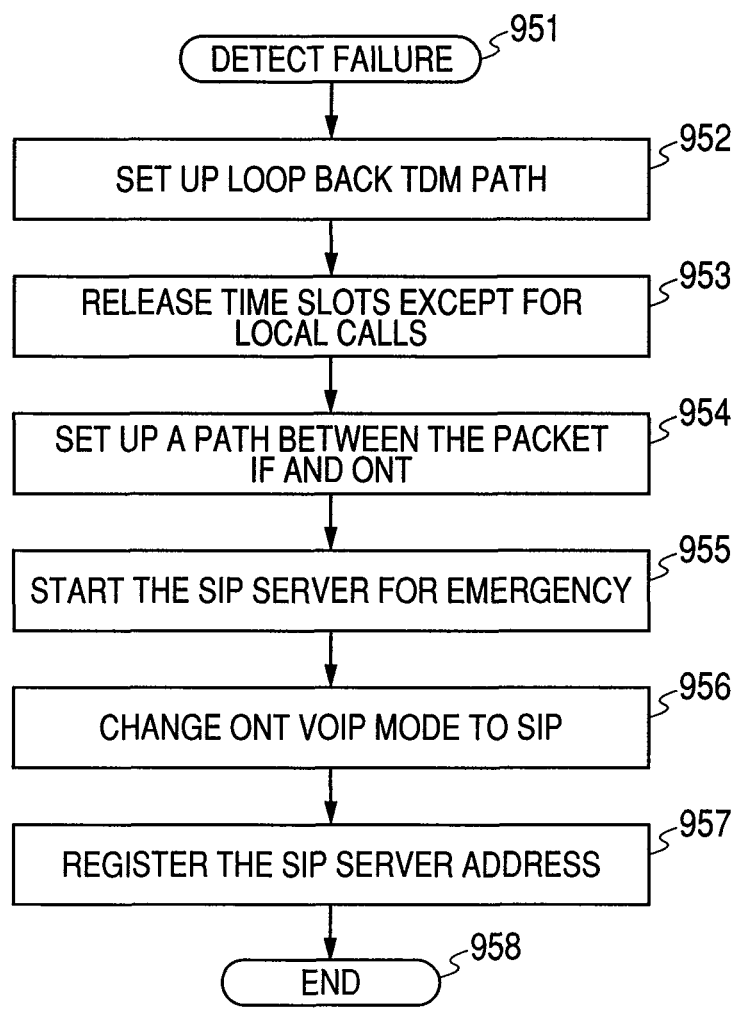
FIG. 25 is a flowchart showing a procedure for entering standalone operation mode according to the second embodiment.

FIG. 25 is a flowchart showing a procedure through which the VGW enters an emergency mode upon occurrence of a telephone network failure. The VGW having detected a telephone network failure (step 951) sets up loopback paths for the time slots assigned to local calls (step 952) and releases the time slots assigned to non-local calls (step 953). Furthermore, to make itself ready to process new calls, the VGW proceeds as follows. Namely, it sets up the logical paths 72a to 72b between the packet interface 15 and the ONTs 3a to 3b shown in FIG. 23 (step 954); starts the SIP server 59 for emergency use (step 955); and broadcasts a message for switching all ONTs into SIP mode to the ONTs (step 957) using a multicast logical path 79 shown in FIG. 21 and starts an SIP client (step 957). Furthermore, the VGW notifies all ONTs to be used of the address of the SIP server 59 (step 958) and terminates the processing (step 959). In a case where there is an SIP server 59 already in operation for another VoIP (voice over IP) service, the SIP server already in operation may be used without additionally starting a server for emergency use.

The voice gateway of the second embodiment can make, when the telephone network fails, new call connections between telephones belonging to ONTs connected to an OLT.

What is claimed is:

1. A passive optical network (PON) system, comprising a plurality of ONTs (optical network terminals) each accommodating a telephone and an OLT (optical line terminal) including a gateway function and being connected to a telephone network,
   wherein the OLT is provided with a storage for storing telephone number information on the telephones connected to the plurality of ONTs;
   wherein the OLT acquires callee telephone number information included in voice data sent from a caller telephone connected to one of the plurality of ONTs to a telephone switch included in the telephone network, and, in a case where the callee telephone is also connected to the one of the plurality of ONTs, records information on a talk channel between the caller telephone and the telephone switch;
   wherein the OLT detects a call incoming from the telephone switch to the callee telephone and records information on a talk channel between the telephone switch and the callee telephone; and
   wherein the OLT, when a failure is detected in the telephone network, connects, based on the information on the two talk channels to which the caller telephone and the callee telephone are connected, respectively, the two talk channels and keeps the call active without involving the telephone network.

2. The PON system according to claim 1,
   wherein each of the plurality of ONTs and the gateway function are provided with a first storage storing a first processing program, as a signaling protocol for telephone service, for connecting the plurality of ONTs to the telephone network via the gateway device and a second storage storing a second processing program for implementing, without involving the telephone network, a telephone service for a call between the plurality of ONTs connected to the gateway device; and
   wherein, when a failure of the telephone network is detected, switching is made, according to a control message from the gateway device, from the first processing program to the second processing program.

3. The PON system according to claim 2,
   wherein, when a failure of the telephone network is detected, the gateway function multicasts a control message to the plurality of ONTs each accommodating a telephone, the control message directing the plurality of ONTs to switch the processing program to be used.

4. A gateway device connected to a telephone network and a plurality of data networks connected to ONTs (optical network terminals) accommodating telephones,
   wherein the gateway device comprises a storage for storing telephone number information on the telephones connected to the plurality of data networks, acquires callee telephone number information included in voice data sent from a caller telephone connected to one of the plurality of data networks to a telephone switch included in the telephone network, records, in a case where the callee telephone is also connected to the one of the plurality of data networks, information on a talk channel between the caller telephone and the telephone switch, detects a call incoming from the telephone switch to the callee telephone, and records information on a talk channel between the telephone switch and the callee telephone; and
   wherein, when a failure is detected in the telephone network, the gateway device connects, based on the information on the two talk channels to which the caller telephone and the callee telephone are connected, respectively, the two talk channels and keeps the call active without involving the telephone network.

5. The gateway device according to claim 4,
   wherein the gateway device further comprises a first storage storing a first processing program, as a signaling protocol for telephone service on the data network side, for connecting the plurality of data networks to the telephone network and a second storage storing a second processing program for implementing a telephone service in the plurality of data networks; and
   wherein, when a failure of the telephone network is detected, the gateway device switches from the first processing program to the second processing program.

6. The gateway device according to claim 5, wherein, when a failure of the telephone network is detected, the gateway device multicasts a control message to the plurality of ONTs accommodating telephones directing them to switch the processing program to be used.

7. The gateway device according to claim 6,
   wherein the gateway device has correspondence information between addresses of the ONTs accommodating telephones and logical paths set up between the gateway device and the ONTs; and wherein, when a packet is received from one of the ONTs, the gateway device detects a logical path corresponding to a destination address of the received packet based on the correspondence information and transmits the received packet through the logical path.

8. The gateway device according to claim 6, wherein the gateway device has first correspondence information between IP addresses and MAC addresses of the ONTs accommodating telephones and second correspondence information between the MAC addresses of the ONTs accommodating telephones and the logical paths set up between the gateway device and the ONTs; and wherein, when a request is received from a first one of the ONTs for converting an IP address of a second one of the ONTs to a MAC address, the gateway device detects a MAC address of the second one of the ONTs based on the first correspondence information, notifies the first one of the ONTs of the detected MAC address, and, when a packet addressed to the detected MAC address is received from the first one of the ONTs, transfers the packet to the second one of the ONTs based on the second correspondence information.

9. The gateway device according to claim 4, wherein the gateway device further comprises a tone generation function for generating a tone used in connecting a call and, when one of the callee telephone and the caller telephone is switched off, transmits a busy tone generated by the tone generation function to the other one of the callee telephone and the caller telephone to release the call connection.

* * * * *